(12) United States Patent
Jonishi

(10) Patent No.: US 8,038,536 B2
(45) Date of Patent: Oct. 18, 2011

(54) GAME SYSTEM, GAME SERVER DEVICE THEREFOR, METHOD OF CONTROLLING GAME SERVER DEVICE, AND TERMINAL DEVICE THEREFOR AND CONTROL PROGRAM PRODUCT FOR CONTROLLING TERMINAL DEVICE

(75) Inventor: Takeshi Jonishi, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1212 days.

(21) Appl. No.: 11/665,989

(22) PCT Filed: Sep. 28, 2005

(86) PCT No.: PCT/JP2005/017847
§ 371 (c)(1),
(2), (4) Date: Apr. 23, 2007

(87) PCT Pub. No.: WO2006/043400
PCT Pub. Date: Apr. 27, 2006

(65) Prior Publication Data
US 2007/0265095 A1 Nov. 15, 2007

(30) Foreign Application Priority Data

Oct. 21, 2004 (JP) ................................. 2004-306460

(51) Int. Cl.
*A63F 9/24* (2006.01)
*A63F 13/00* (2006.01)
*G06F 17/00* (2006.01)
*G06F 19/00* (2006.01)

(52) U.S. Cl. ........................................................ 463/42

(58) Field of Classification Search ..................... 463/40
See application file for complete search history.

(56) References Cited

U.S. PATENT DOCUMENTS 5,577,913 A 11/1996 Moncrief et al.
(Continued)

FOREIGN PATENT DOCUMENTS
EP 1 371 403 A2 12/2003
(Continued)

OTHER PUBLICATIONS

Arcade Gamer mo Nattoku- VF.NET & Keitaide Asobo!!, Arcadia, Sep. 1, 2001, Enterbrain Inc., p. 10-17, vol. 2, No. 9.

(Continued)

*Primary Examiner* — David L Lewis
*Assistant Examiner* — Reginald A Renwick
(74) *Attorney, Agent, or Firm* — Sughrue Mion, PLLC

(57) ABSTRACT

A game system has a plurality of game devices (1), a game server device (3) that communicates with the plurality of game devices (1) to obtain a game result for each of a plurality of players, and a plurality of portable terminals (terminal devices) (4) operated individually by at least one of the plurality of game players. The game server device (3) stores private player identifiers for identifying each of the plurality of players and their game results. The game server device (3) also stores a private player identifier of one player in association with a private player identifier of a competitor player specified by the one player, and game server device (3), when it receives from a portable terminal (4) a view request instructing that a game result of the competitor player, transmits a view response containing the game result.

27 Claims, 17 Drawing Sheets

| PRIVATE PLAYER ID | WEEK ID | MODE ID | SCORE | CLEAR FLAG | LAST UPDATE | NO. OF PLAYS |
|---|---|---|---|---|---|---|
| A1 | 2 | SINGLE | 450 | YES | 2004/1/8 | 1 |

T6

U.S. PATENT DOCUMENTS

| | | |
|---|---|---|
| 7,214,133 B2 | 5/2007 | Jen et al. |
| 2003/0093168 A1 | 5/2003 | Nagaoka |
| 2003/0228557 A1 | 12/2003 | Abe |
| 2004/0157654 A1 | 8/2004 | Kataoka et al. |
| 2004/0204235 A1* | 10/2004 | Walker et al. .......... 463/29 |
| 2005/0209008 A1 | 9/2005 | Shimizu et al. |

FOREIGN PATENT DOCUMENTS

| | | |
|---|---|---|
| JP | 2854809 B2 | 11/1998 |
| JP | 2002-143566 A | 5/2002 |
| JP | 2003-38855 A | 2/2003 |
| JP | 2003-93746 A | 4/2003 |
| JP | 2004-8559 A | 1/2004 |
| WO | WO 02/089937 A1 | 11/2002 |
| WO | 03/103788 A1 | 12/2003 |

OTHER PUBLICATIONS

"Arcade Gamer mo Nattoku; VF. NET & Keitaide Asobo!!"; Arcadia, 2001 09, Enterbrain, Inc., Sep. 1, 2001, vol. 2, No. 9, pp. 10-17.

* cited by examiner

FIG. 9

| PRIVATE PLAYER ID | MUSIC NO. | SINGLE-MODE SCORE | DOUBLE-MODE SCORE | CLEAR FLAG | LAST UPDATE | NO. OF PLAYS |
|---|---|---|---|---|---|---|
| A1 | 1 | 350 | 500 | YES | 2004/9/21 | 5 |
| B1 | 1 | 250 | | YES | 2004/8/25 | 2 |

| PRIVATE PLAYER ID | COURSE ID | MODE ID | SCORE | CLEAR FLAG | LAST UPDATE | NO. OF PLAYS |
|---|---|---|---|---|---|---|
| A1 | 1 | SINGLE | 500 | YES | 2004/9/21 | 5 |
| A1 | 1 | DOUBLE | 600 | NO | 2004/9/21 | 2 |

| PRIVATE PLAYER ID | WEEK ID | MODE ID | SCORE | CLEAR FLAG | LAST UPDATE | NO. OF PLAYS |
|---|---|---|---|---|---|---|
| A1 | 2 | SINGLE | 450 | YES | 2004/1/8 | 1 |

| WEEK ID | MUSIC NO. | START DATE | END DATE |
|---|---|---|---|
| 2 | 1 | 2004/1/4 | 2004/1/10 |

| PRIVATE PLAYER ID | LEVEL ID | PASS OR FAIL FLAG |
|---|---|---|
| A1 | RANK 7 | PASS |
| A1 | RANK 6 | FAIL |
| B1 | RANK 1 | PASS |

T8

GAME SYSTEM, GAME SERVER DEVICE THEREFOR, METHOD OF CONTROLLING GAME SERVER DEVICE, AND TERMINAL DEVICE THEREFOR AND CONTROL PROGRAM PRODUCT FOR CONTROLLING TERMINAL DEVICE

TECHNICAL FIELD

The present invention relates to a network-type game system, to a game server device, and to a method of controlling the game server device, and the present invention relates to a terminal device and to a control program product for controlling the terminal device.

BACKGROUND ART

In a network-type game system, a plurality of game devices installed in a venue (a game arcade) is connected to a server device residing on a network. In such a game system, there is known a technique in which, when a player performs a play at a game device, game results such as scores are obtained by the server device, and the server device posts score rankings on the Internet.

There is also known a technique in which a portable terminal (terminal device) functions as a game terminal, and such a portable terminal is used to display ranking data stored in a server device. Examples of such known techniques will be described below.

In a technique disclosed in Japanese Patent Application Laid-Open Publication No. 2002-143566, a game is played using a portable terminal, and rankings are displayed during a download waiting time.

Another technique disclosed in Japanese Patent Application Laid-Open Publication No. 2003-38855 allows a server device to create a list of score rankings in a network game. The list is posted, for example, on a wireless communication network for portable terminals, and ranking data is transmitted from a server device. Examples of ranking data include a first-player-to-clear-a-stage ranking, a score ranking, etc.

In Japanese Patent Application Laid-Open Publication No. 2003-93746, a portable phone is shown as an example of a portable terminal in a ranking service providing system. In this system, a player is able to receive information on the player's own ranking.

Thus, in a conventional network-type game system, a player is able to know, using a portable terminal, score rankings of highly skilled players and the player's own ranking.

An advantage provided in a network-type game system is that a plurality of players is allowed to participate in a game play and to compete with one another in scores regardless of time and place. The rankings posted, however, include ranking data of a plurality of players who participate in a game, but they do not include those of particular players. Therefore, it is not possible for a player to compare the player's own score with, for example, scores of other players ranked about the same in overall ranking or scores of a particular player, such as a friend of the player.

DISCLOSURE OF INVENTION

The present invention was made in consideration of the above, and the present invention has as objects to provide a game system in which one player is allowed to know the game results of another player using a terminal device, a server device therefor, and a method of controlling the server device, and to provide a terminal device therefor and a control program product for controlling the terminal device.

In the following, a description will be given of the present invention. It should be noted that reference numerals in the attached drawings are shown in parentheses to facilitate understanding of the present invention, but this is not intended to limit the present invention to the embodiments as shown in the drawings.

To solve the above problems, in one aspect, a game system according to the present invention has a plurality of game devices (1), a game server device (3) that communicates with the game devices (1) to obtain results of games for a plurality of players, and a plurality of terminal devices (4) operated individually by at least one of the players, and the game server device (3) has a storage unit (18) that stores a player identifier for identifying each of the players in association with a recording medium identifier for identifying an information recording medium (2) used by each of the players in playing the game device (1), that stores the player identifier in association with result information indicating a game result, and that stores a player identifier of one of the players in association with a player identifier of another of the players, the another player being specified by the one player, and each of the game devices (1) has: a reader (13) that reads the recording medium identifier from the information recording medium (2); a generator (11) that generates the result information according to a game result; and a transmitter (17) that transmits the result information and the recording medium identifier to the game server device (3), wherein each of the terminal devices (4) has: a display (45); an inputter (44) that receives player's instructions; an identifying unit (41) that identifies the player identifier of the another player when the one player specifies the another player by operating the inputter (44); a player-identifier storage (4721) that stores the player identifier of the one player; a registration requester (41, 46) that generates a registration request containing the player identifier of the one player and the player identifier of the another player identified by the identifying unit (41) and instructing that the another player be registered in association with the one player, the registration request then being transmitted to the game server device (3); a view requester (41, 46) that generates a view request containing the player identifier of the one player and instructing that the result information of the another player be transmitted as a response, the view request then being transmitted to the game server device (3), registration of the another player having been instructed by the registration requester (41, 46), with the registration being made in association with the one player; and a response processor (41) that, upon receiving from the game server device (3) a view response containing result information of the another player, causes the result information to be displayed on the display (45), registration of the another player having been instructed so that the another player is registered in association with the one player and the view response being a response to the view requester, and the game server device (3) executes: a process of, upon receiving from one of the game devices (1) the result information and the recording medium identifier, storing in the storage unit (18) the result information in association with a player identifier corresponding to the recording medium identifier; a process of, upon receiving the registration request from one of the terminal devices (4), storing in the storage unit (18) the player identifier of the one player and the player identifier of the another player in association with each other, the player identifier of the one player and the player identifier of the another player being contained in the registration request; and a process of, upon receiving the view request from one of the terminal devices (4), obtaining the player identifier of the another player corresponding to the player identifier of the one player contained in the view request, obtaining the result information corresponding to the player identifier of the another player, and transmitting the result information to the terminal device (4).

According to this game system, when each player plays a game at a game device, their game results are collectively stored in the game server device. Furthermore, each player, using a terminal device, can specify another player so that a personal player identifier and a player identifier of the specified player are registered in association with each other at a game server device. A game result of the registered another player can be displayed at a terminal device. In this case, since a game server device simply registers a player identifier of one player in association with that of the specified another player, a storage capacity of a storage unit can be reduced compared to a case in which a player identifier of one player is stored in correspondence with result information of another player. Moreover, the game server device, when result information is updated after another player plays a game at a game device, transmits, to a terminal device of one player, result information of another player in response to a view request, instead of immediately transmitting the updated result information to the terminal device. Therefore, communication is performed only when required by a player. As a result, communication resources can be conserved. The result information can be any information indicating a game result, such as a score, a level (rank) being an index indicating a player's skill, a hit probability in a shooting game, or the number of music pieces cleared in a music game. The player identifier can be any information if it allows identification of an individual player, and one player identifier may include a plurality of player identifiers. For example, one player identifier may include one private player identifier identifying a player and one public player identifier identifying the same player. In this embodiment, a player identifier identified by the identifying unit may be a private or a public player identifier, or may be both private and public player identifiers. The present embodiment effectively functions in a case in which a private player identifier is information to be kept confidential to those other than an operator of this game system and in which a public player identifier is information that need not be kept confidential.

In another aspect, a game server device according to the present invention has: a storage unit (18) that stores a player identifier for identifying each of a plurality of players in association with result information indicating a game result of each player, and that stores the player identifier of one of the players in association with a player identifier of another of the players, the another player being specified by the one player; a registrator (31) that, upon receiving from a terminal device (4) a registration request containing the player identifier of the one player and the player identifier of the another player, with the registration request instructing that the another player be registered in association with the one player, registers in the storage unit (18) the player identifier of the another player in association with the player identifier of the one player; a first obtainer (31) that, upon receiving from the terminal device (4) a view request containing the player identifier of the one player and instructing that result information of the another player be registered by the registrator (31) in association with the one player be transmitted as a response, identifies the player identifier of the another player registered in association with the player identifier of the one player to obtain from the storage unit (18) result information in association with the identified player identifier of the another player; and a first replier (31, 32) that transmits to the terminal device (4) a view response containing the obtained result information as a response to the view request.

According to this invention, the game server device can register one player in association with another player specified by the one player when a registration request is received from a terminal device. With this association having been made, when a view request is received from a terminal device, it becomes possible to reply to the terminal device with result information of the another player without a player identifier of the another player being contained in the view request itself. That is, once a player registers another player, result information of the registered another player can be obtained at a terminal device without specifying another player. In other words, a player identifier of another player need not be transmitted every time a view request is transmitted. As a result, communication resources can be conserved. The present invention is therefore well suited for a large-scale game system in which a large number of players gather to play. Furthermore, there is no need to store a player identifier of another player at a terminal device.

In a preferred embodiment, the game server device may further comprise: a second obtainer that, upon receiving from the terminal device (4) a candidate request containing the player identifier of the one player and instructing that candidates for a player to be compared with the one player be transmitted as a response, obtains from the storage unit (18) result information corresponding to the player identifier of the one player contained in the candidate request; a searcher (31) that performs a search in the storage unit (18) for retrieval of a player identifier of one or a plurality of other players whose game results fall within a predetermined range with the obtained result information as a standard; and a second replier (31, 32) that generates a candidate response containing a player identifier retrieved by the searcher (31) or a candidate response containing information that no player identifier has been retrieved by the searcher (31), the candidate response then being transmitted to the terminal device (4) as a response to the candidate request. According to this aspect of the invention, it is possible for a player to identify another player who has a skill that is close to that of the player's own because the game server device, upon receiving a candidate request, transmits to a terminal device information on one or more other players as candidates whose game results fall within a predetermined range with a game result of one player as a standard. As a result, it becomes possible to assist each player in specifying the player's competitor.

More specifically, in a case in which the storage unit (18) has stored the player identifier being in association with name information indicating a name of each of the players, the game server device may further comprise: a searcher (31) that, upon receiving from the terminal device (4) a candidate request containing name information and instructing that candidates for a player to be compared with the one player be transmitted as a response, performs a search in the storage unit (18) for retrieval of a player identifier corresponding to the name information contained in the candidate request; and a second replier (31, 32) that generates a candidate response containing the player identifier retrieved by the searcher (31) or a candidate response containing information that no player identifier has been retrieved by the searcher (31), the candidate response then being transmitted to the terminal device (4) as a response to the candidate request. According to the embodiment, since a game server device transmits a candidate response with name information, it becomes possible to display candidates for comparison by their names at a terminal device. The name can include a last name, a first name, an abbreviated name, a common name, or a nickname.

Furthermore, in the above game server device, in a case in which the storage unit (18) has stored the player identifier in association with district information indicating a district indicating a location of each player, the game server device may further comprise: a searcher (31) that, upon receiving from the terminal device (4) a candidate request containing district information and instructing that candidates for a player to be compared with the one player be transmitted as a response, performs a search in the storage unit (18) for retrieval of a player identifier corresponding to the district information contained in the candidate request; and a second replier (31, 32) that generates a candidate response containing the player identifier retrieved by the searcher (31) or a candidate response containing information that no player identifier has been retrieved by the searcher (31), the candidate response then being transmitted to the terminal device (4) as a response to the candidate request. According to the present invention, a player can specify a district as a criterion when a player searches for another player for comparison. For example, a player in Hokkaido can specify a player in Okinawa as a competitor if the district is specified as Okinawa. Also, it is possible to specify a shop that the player frequently visits as the district, thereby specifying another player who visits the same shop as a competitor.

Preferably, the searcher (31) may obtain from the storage unit (18) the result information corresponding to the retrieved player identifier; and the second replier (31, 32) may generate the candidate response containing the player identifier and the result information and transmits the candidate response to the terminal device (4) as a response to the candidate request.

In still another aspect, a terminal device according to the present invention communicates with a game server device (3) which communicates with a plurality of game devices (1) to obtain result information indicating a game result for each of a plurality of players and to store a player identifier for identifying each of the players in association with result information of the each player, and the terminal device has a display (45); an inputter (44) that receives instructions from one of the players; an identifying unit (41) that, when the one player specifies another of the players by operating the inputter (44), identifies a player identifier of the another player; a player-identifier storage (4721) that stores a player identifier of the one player; and a registration requester (41, 46) that generates a registration request containing the player identifier of the one player and the player identifier of the another player identified by the identifying unit (41), the registration request then being transmitted to the game server device (3).

According to this invention, since a pre-stored player identifier of one player and a player identifier of another player specified by the one player are transmitted to the game server device, one player and another player can be associated with each other at the game server device.

In a preferred embodiment of the above terminal device, the identifying unit (41) may perform a process of causing a screen prompting for an input of the player identifier of the another player to be displayed on the display (45) and a process of obtaining the player identifier of the another player input by the inputter (44). In this case, one player can identify another player by inputting a player identifier of the another player.

Furthermore, in a case in which the game server device (3) has stored a player identifier and name information indicating a name of each player stored in association with each other, the terminal device (4) may further comprise a candidate requester (41, 46) that generates, in accordance with operations of the inputter (44), a candidate request containing the player identifier of the one player and instructing that candidates for a player to be compared with the one player be transmitted as a response, the candidate request then being transmitted to game server device (3), and the identifying unit (41) may perform: a process of, upon receiving from the game server device (3) a candidate response containing a player identifier specifying a candidate for a player to be compared with the one player and also containing name information, the candidate response being a response to the candidate request, causing the candidate to be displayed on the display (45) on the basis of the name information, and a process of, when the one player uses the inputter (44) to select the candidate displayed on the display (45), identifying a player identifier corresponding to the selected candidate as the player identifier of the another player. In this case, a player can specify another player for comparison by selecting a candidate name.

In a preferred embodiment, the terminal device (4) may comprise a view requester (41, 46) that generates a view request containing the player identifier of the one player read from the player-identifier storage (4721) and instructing that result information of the another player be transmitted as a response, the view request then being transmitted to the game server device (3), registration of the another player having been instructed by the registration requester (41, 46), with the registration being made in association with the one player; and a response processor (41) that, upon receiving from the game server device (3) a view response containing the result information of the another player corresponding to the one player, with the view response being a response to the view request, causes the result information to be displayed on the display (45), registration of the another player having been instructed so that the another player is registered in association with the one player. In this case, a terminal device is able to obtain result information of another player by transmitting in advance a registration request. Also, since a player identifier of another player need not be contained in a view request, communication resources can be conserved.

In another preferred embodiment, the terminal device (4) may comprise a view requester (41, 46) that generates a view request containing the player identifier of the one player read from the player-identifier storage (4721) and instructing that result information of the another player be transmitted as a response, the view request then being transmitted to the game server device (3), registration of the another player having been instructed by the registration requester (41, 46) so that the another player is registered in association with the one player; a result-information storage that stores the result information of the another player, registration of the another player having been instructed so that the another player is registered in association with the one player; a writer (41) that, upon receiving from the game server device (3) a view response as a response to the view request, the view response containing result information of the one player and the result information of the another player, writes in the result-information storage the result information of the one player and the result information of the another player, registration of the another player having been instructed so that the another player is registered in association with the one player; a reader that, upon receiving the view response from the game server device (3), reads from the result-information storage the result information of the one player and the result information of the another player stored as of the time a view response immediately previous to the view response was received, registration of the another player having been instructed so that the another player is registered in association with the one player; a determiner that determines, as conditions for determination, whether the result information of the one player read by the reader exceeds the result information of the another player read by the reader and whether the result information of the one player contained in the received view response falls below the result information of the another player contained in the received view response, registration of the another player having been instructed so that the another player is registered in association with the one player; and a response processor (41) that, in a case in which the determination conditions are found to be affirmative, causes the result information of the another player to be displayed on the display (45), registration of the another player having been instructed so that the another player is registered in association with the one player. According to the present invention, result information of another player can be displayed in a case in which a personal game result was above another player's game result at an earlier point in time and in which a personal game result currently falls below a game result of the another player. That is, a player is able to know that that player has been overtaken by a competitor or by a friend. Since result information is compared at a terminal device in this case, a processing load on the game server device can be reduced.

In still another aspect of the present invention, a method of controlling a game server device (3) capable of communicating with a plurality of terminal devices (4) has: storing a player identifier for identifying one player and a player identifier of another player specified by the one player in association with each other; storing, upon receiving from one of the terminal devices (4) a registration request containing the player identifier of the one player and the player identifier of the another player and instructing that the another player be registered in association with the one player, stores the player identifier of the one player in association with the player identifier of the another player; identifying, upon receiving from the terminal device (4) a view request containing the player identifier of the one player and instructing that result information of the another player registered in association with the one player be transmitted as a response, a player identifier of the another player registered in association with the player identifier of the one player; obtaining result information that is associated with the identified player identifier of the another player; and transmitting to the terminal device (4) a view response containing the obtained result information as a response to the view request.

According to the present invention, one player is registered in association with another player specified by the one player. Therefore, when a view request is received from a terminal device, result information of another player can be transmitted to the terminal device even in a case in which the view request does not contain a player identifier of another player. Thus, a player, once that player registers another player, is able to obtain result information of the another player thereafter without specifying the another player.

In a preferred embodiment, the method of controlling a game server device may further comprise obtaining, upon receiving from the terminal device (4) a candidate request containing the player identifier of the one player and instructing that candidates for a player to be compared with the one player be transmitted as a response, result information that is in association with the player identifier of the one player contained in the candidate request; searching for retrieval of a player identifier of one or a plurality of players whose game result falls within a predetermined range with the obtained result information as a standard; and generating a candidate response containing the retrieved player identifier or a candidate response containing information that no player identifier has been retrieved and transmitting the candidate response to the terminal device (4) as a response to the candidate request. According to the invention, since the game server device, upon receiving a candidate request, transmits information on one or more other players as candidates whose game results fall within a predetermined range with a game result of one player as a standard, one player is able to identify a player for comparison who has a skill level that is close to that of that one player. As a result, it is possible to assist each player in specifying that player's desired competitors.

In yet another aspect, the present invention provides a control program product for use in a terminal device (4) that has a communicator that communicates with a game server device (3) capable of communicating with a plurality of game devices (1) to obtain result information indicating a game result for each of a plurality of players and to store a player identifier for identifying each of the players in association with the result information, and that has a display (45), an inputter (44) that receives instructions from one of the players, a player-identifier storage (4721) that stores a player identifier of the one player, and an information processor (41), and the program product causes the information processor (41) to execute: a process of, when the one player operates the inputter (44) to identify another of the players, identifying a player identifier of the another player; a process of generating a registration request containing the player identifier of the one player and the player identifier of the another player and instructing that the another player be registered in association with the one player; and a process of transmitting the registration request to the game server device (3). According to the present invention, since a pre-stored player identifier of one player and a player identifier of another player specified by the one player are transmitted to the game server device, it becomes possible to associate the one player and the another player with each other at the game device.

In a preferred embodiment, the process of identifying the player identifier of the another player may include: a process of causing a screen prompting for an input of the player identifier of the another player to be displayed on the display (45); and a process of obtaining the player identifier of the another player input by the inputter (44). In this case, one player inputs a player identifier of another player, to thereby specify another player for comparison.

Furthermore, in a case in which the game server device (3) stores the player identifier and name information indicating a name of each of the players in association with each other, the information processor (41) may be further caused to execute: a process of generating a candidate request in accordance with operations of the inputter (44) a candidate request containing the player identifier of the one player and instructing that candidates for a player to be compared with the one player be transmitted as a response; a process of transmitting the candidate request to the game server device (3); a process of, upon receiving from the game server device (3) a candidate response containing a player identifier specifying a candidate for a player to be compared with the one player and also containing name information, with the candidate response being a response to the candidate request, causing the candidate for a player to be compared with the one player to be displayed on the display (45) on the basis of the name information; and a process of, when the player uses the inputter (44) to select the candidate displayed on the display (45), identifying a player identifier corresponding to the selected candidate as the player identifier of the another player. According to this embodiment, a player can specify another player for comparison by simply selecting a candidate name.

In a preferred embodiment, the control program product may further cause the information processor (41) to execute:

a process of generating a view request containing the player identifier of the one player read from the player-identifier storage (4721) and instructing that result information of the another player be transmitted as a response, registration of the another player having been instructed so that the another player is registered in association with the one player; a process of transmitting the view request to the game server device (3); and a process of, upon receiving from the game server device (3) a view response containing the result information of the another player registered in association with the one player, with the view response being a response to the view request, causing the result information to be displayed on the display (45). In this case, a terminal device is able to obtain result information of the another player by transmitting a registration request in advance. Furthermore, since a player identifier of another player need not be contained in a view request, communication resources are conserved.

Furthermore, the control program product may further cause the information processor (41) to execute: a process of generating a view request containing the player identifier of the one player read from the player-identifier storage (4721) and instructing that result information of the one player and result information of the another player be transmitted as a response, registration of the another player having been instructed so that the another player is registered in association with the one player; a process of transmitting the view request to the game server device (3); a process of storing the result information of the one player and the result information of the another player, registration of the another player having been instructed so that the another player is registered in association with the one player; a process of storing, upon receiving from the game server device (3) a view response containing the result information of the one player and the result information of the another player, registration of the another player having been instructed so that the another player is registered in association with the one player and the view response being a response to the view request, the result information of the one player and the result information of the another player contained in the view response; a process of reading, upon receiving the view response from the game server device (3), the result information of the one player and the result information of the another player stored as of the time a view response immediately previous to the view response was received, registration of the another player having been instructed so that the another player is registered in association with the one player; a process of determining, as conditions for determination, whether the result information of the one player read by the reader exceeds the result information of the another player read by the reader and whether the result information of the one player contained in the received view response falls below the result information of the another player contained in the received view response, registration of the another player having been instructed so that the another player is registered in association with the one player; and a process of, when the determination conditions are found to be affirmative, causing the result information of the another player to be displayed on the display (45), registration of the another player having been instructed so that the another player is registered in association with the one player.

According to the present invention, result information of another player can be displayed in a case in which a personal game result was above another player's game result at an earlier point of time and in which a personal game result falls below a game result of the another player at present. That is, a player is able to know that that player has been overtaken by a competitor or by a friend. In this case, since result information is compared at a terminal device, the processing load on the game server device can be reduced.

EFFECTS OF THE INVENTION

According to the present invention, one player is allowed to know a game result of another player specified by the one player using a portable terminal.

BRIEF DESCRIPTION OF DRAWINGS

FIG. 9 is a diagram showing details of a single-piece-of-music table in the game server device of FIG. 5.

FIG. 10 is a diagram showing details of an expert table in the game server device of FIG. 5.

FIG. 11 is a diagram showing details of a weekly ranking table in the game server device of FIG. 5.

FIG. 12 is a diagram showing details of a schedule table in the game server device of FIG. 5.

FIG. 13 is a diagram showing details of a level table in the game server device of FIG. 5.

BEST MODE FOR CARRYING OUT THE INVENTION

Figure 1:
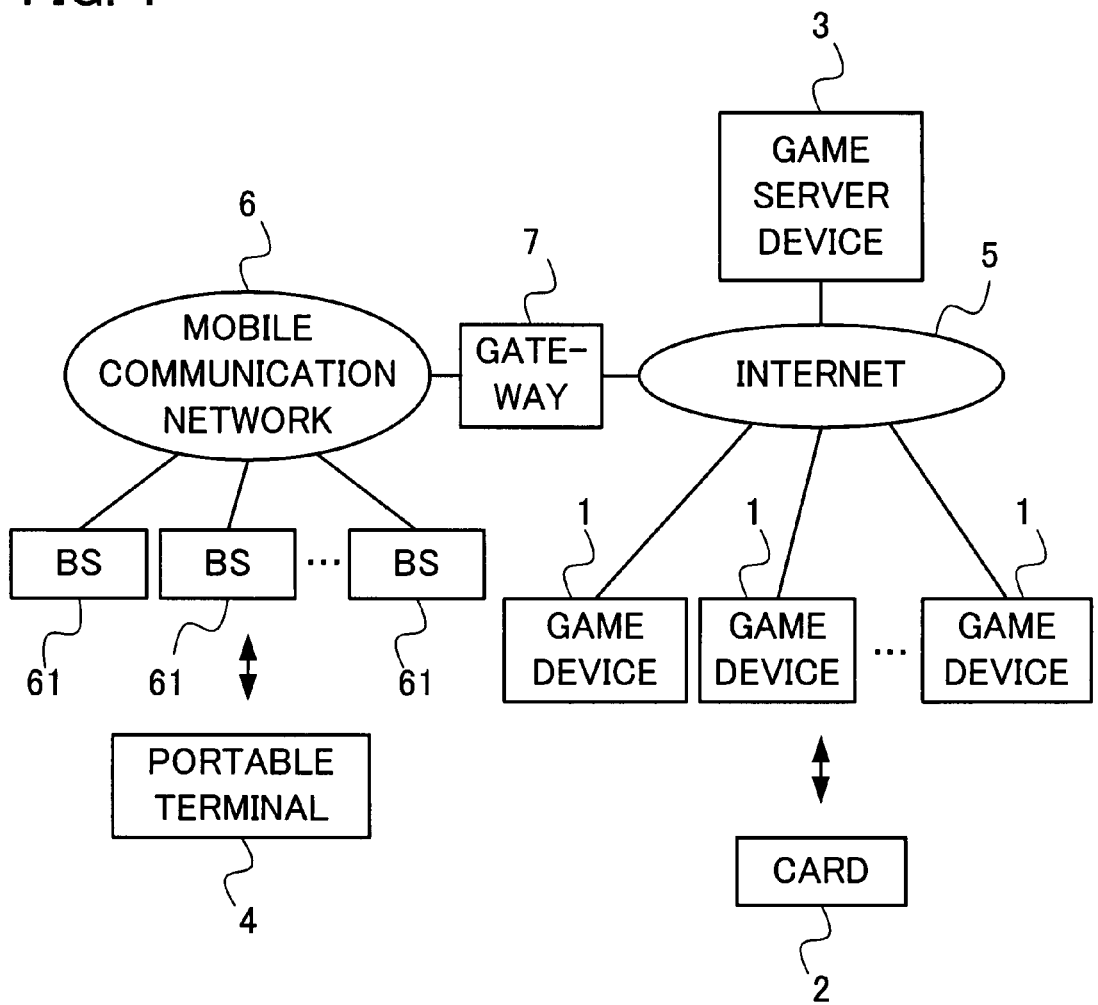
FIG. 1 is a block diagram of a communication system including a game system according to an embodiment of the present invention.

Configuration:

FIG. 1 is a block diagram showing a communication system comprising a game system according to an embodiment of the present invention. The communication system has a large number of game devices 1, a large number of cards 2, a game server device 3 connected to the Internet 5, and a large number of portable terminals 4.

Game device 1 is a terminal that enables a player to play a predetermined game by paying a charge. Game device 1 is connected to the Internet 5 and is capable of performing data communication with game server device 3. One or more game devices 1 are installed at a shop or a venue where visitors are able to use game devices 1. A player plays a predetermined game at a shop using game device 1 to thereby gain a game result. A game result is an evaluation of one or a plurality of game plays and is, for example, a score or a level.

Card 2 is a portable information recording medium that magnetically records information, and it records a card ID (recording medium identifier) identifying the card itself. Though described later in detail, the card ID is read by game device 1 and is used at game server device 3. A player can own one or more cards 2 and select one of that player's own cards 2 for use in a play of a predetermined game.

Portable terminal 4 is an example of a terminal device. Portable terminal 4 is a computer that notifies its user of a game result of a player, and the terminal 4 functions as a portable telephone capable of using, via base stations (BS) 61, a mobile communication network 6 which provides data communication and telephone communication services. Base stations 61 are dispersed so as to cover a service area of mobile communication network 6 in cooperation with one another, and each base station 61 is capable of wirelessly communicating with portable terminal 4 within an area which each base station 61 covers. Mobile communication network 6 is connected to the Internet 5 through a gateway 7 and is capable of providing a mobile internet access service. The "mobile internet access service" is a service that enables interactive communication between a mobile communication terminal such as a portable telephone service and a website on the Internet. According to this service, a mobile communication terminal is able to display characters and images provided from the site on its display and also to download an application program from the site. Examples of mobile internet access services include, for example, an "i-mode®" service developed by NTT DoCoMo Inc., Tokyo, Japan, and a service in accordance with a "WAP (Wireless Application Protocol)" developed by the WAP Forum. Gateway 7 converts a communication protocol of mobile communication network 6 into that of the Internet 5, and vice versa. Specifically, gateway 7 is, for example, an i-mode server in the i-mode service or a WAP proxy (WAP gateway) in the WAP service. Each portable terminal 4 is capable of performing data communication with game server device 3 via mobile communication network 6 and the Internet 5. It should be noted that in the present embodiment, portable terminal 4 that also functions as a portable telephone is used as a terminal device, but the terminal device is not limited thereto. A portable or a fixed computer can also be used as a terminal device.

Game server device 3 is a computer that retains game results in association with card IDs. Game server device 3 may be comprised of one computer or of a plurality of network-connected computers. Game server device 3 is capable of performing data communication with a correspondent device via the Internet 5.

Figure 2:
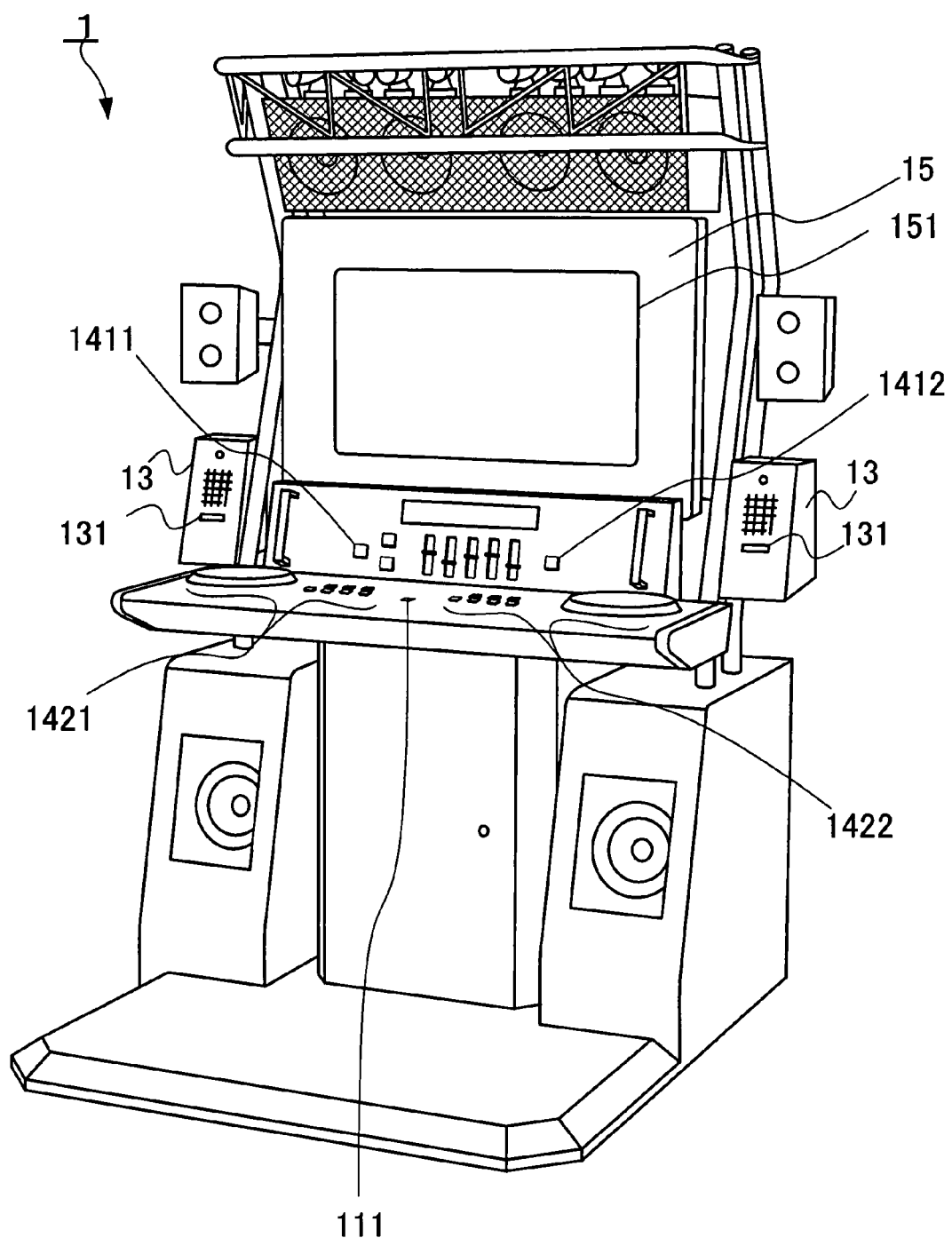
FIG. 2 is a perspective view showing an external view of a game device comprised in the communication system of FIG. 1.
Figure 3:
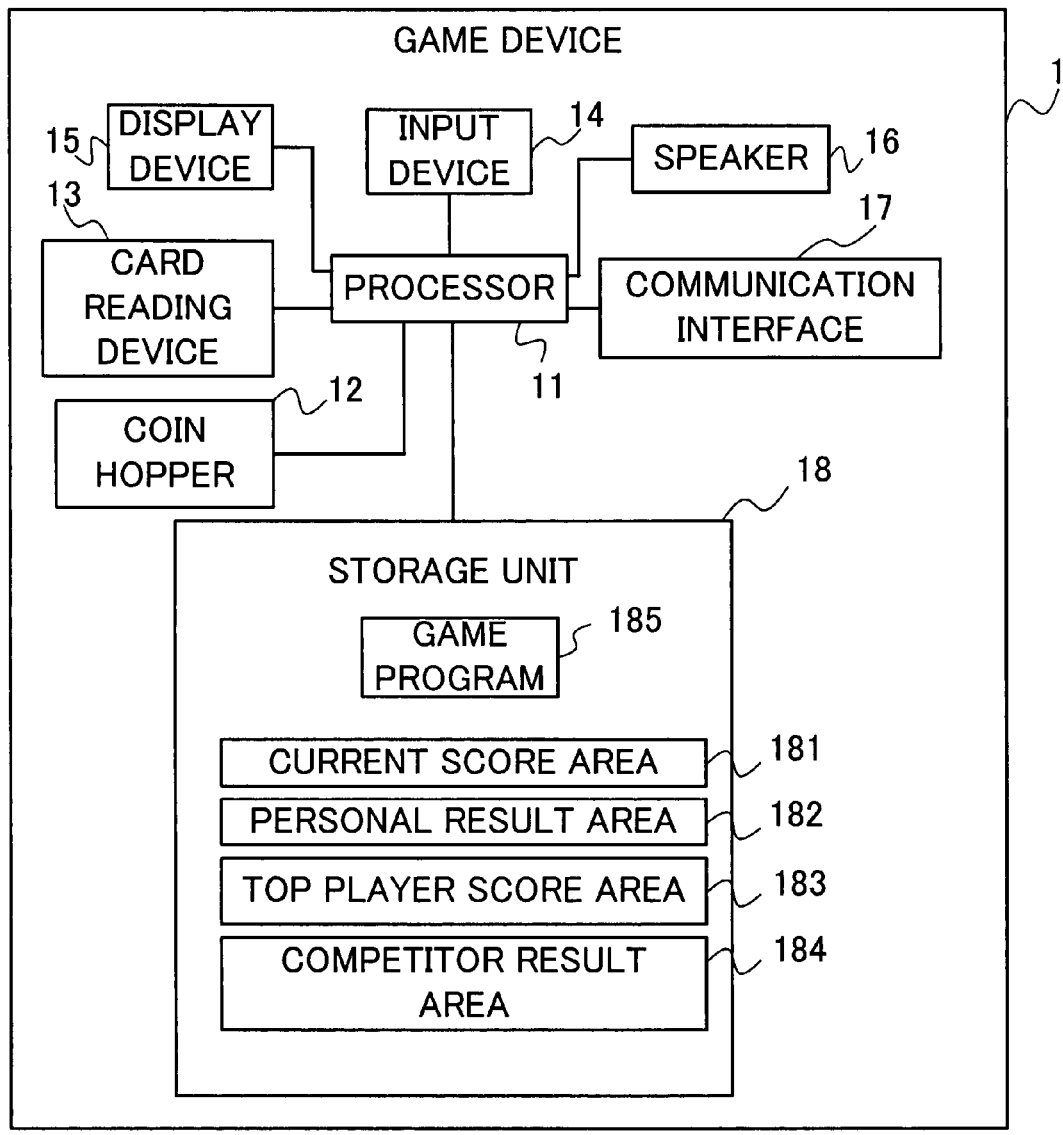
FIG. 3 is a block diagram showing a configuration of the game device of FIG. 2.

FIG. 2 is a perspective view showing an external view of game device 1 comprised in the communication system of FIG. 2, and FIG. 3 is a block diagram showing a configuration of game device 1. As shown in these figures, game device 1 has a processor 11, a coin hopper 12, a card reading device (reader) 13, an input device (inputter) 14, a display device (display) 15, a speaker 16, and a communication interface 17, and a storage unit 18.

Coin hopper 12 distinguishes coins inserted from a coin acceptance slot 121 formed on a body of game server device 3, and the hopper accepts a coin if the coin is of a predetermined type and supplies a coin acceptance signal to processor 11. The predetermined type of coin is something which has a value corresponding to a game play charge with one or more pieces and is, for example, hard currency (hard money).

There is formed in card reading device 13 a card acceptance slot 131 for inserting a card 2. Card reading device 13, when card 2 is inserted from card acceptance slot 131, reads a card ID from card 2 to supply a signal indicating the card ID to processor 11.

Input device 14 has a plurality of operators and, when an operator is operated, supplies processor 11 with a signal that is unique to the operator.

Display device 15 has a display area 151 and displays a game screen in display area 151 after receiving an image data from processor 11.

Speaker 16 outputs sounds after receiving music sound signals from processor 11.

Communication interface 17 is connected to the Internet 5 directly or via a relay device such as a router and relays data between processor 11 and the Internet 5.

Storage unit 18 has a nonvolatile memory such as a ROM (Read Only Memory) and has a rewritable memory such as a RAM (Random Access Memory).

In the rewritable memory, there are held a current score area 181, a personal result area 182, a top player score area 183, and a competitor result area 184. Current score area 181 is a memory area for storing the score of a game a player is currently playing. Personal result area 182 is a memory area for past game results of a player currently playing a game. Top player score area 183 is a memory area for storing the highest score among past game results of all players who have played a game in the game system of FIG. 1. Competitor result area 184 is a memory area for storing game results of competitor players of the currently playing player in association with the names of the competitor players. An competitor of the current player is another player specified by the current player in advance.

There has been written in the nonvolatile memory a game program 185. Processor 11 executes game program 185, so as to thereby function as a game executor that causes a player to play a predetermined game.

Description will now be given of the details of a predetermined game to facilitate understanding of specific functions of the game executor.

In the predetermined game, one of two play modes can be selected. One of the play modes is a single-player mode in which a single player plays a game using a single game device 1, and the other mode is a two-player mode in which two players play a game simultaneously using a single game device 1. To enable the two-player mode, input device 14 has a start button 1411 and a set of play operators 1421 for the first player and also has a start button 1412 and a set of play operators 1422 for the second player. The set of play operators is a group of operators operated during a play of the predetermined game, and each set of play operators includes one control wheel and seven buttons.

Furthermore, in the predetermined game, one of the two operation modes can be selected. One of the operation modes is a single mode in which play operators 1421 only are used, and the other operation mode is a double mode in which play operators 1421 and 1422 for the first and second players are used. In the single-player mode, only the single mode is selectable.

Figure 4:
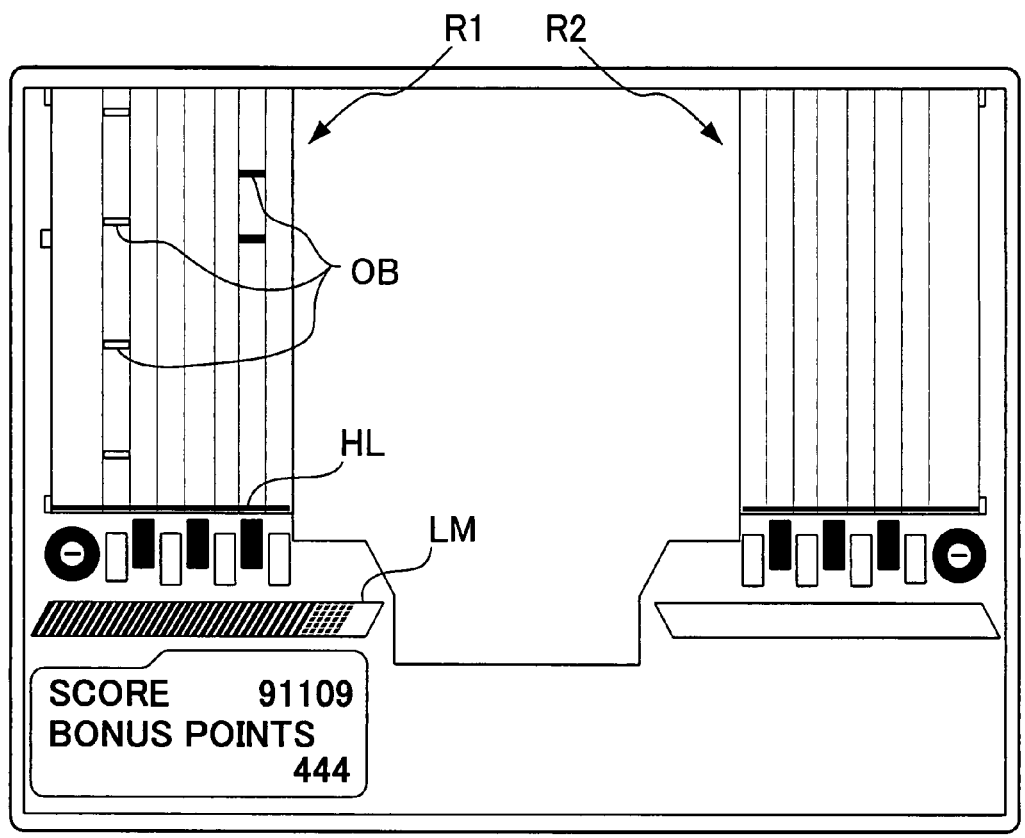
FIG. 4 shows an example game screen displayed in a display area of the game device.

FIG. 4 is a diagram showing an example of a game screen displayed in display area 151 of game device 1.

This screen shows a case in which the predetermined game is played using game device 1 in the single-player mode and the single mode without using card 2. A game area R1 is reserved in a left portion of the game screen, and a game area R2 is reserved in a right portion. In the game area R1, objects OB appear in an upper portion of the figure, fall along one of eight columns, and disappear in a lower portion of the figure to the music selected in advance. There exists, slightly above a point at which objects OB disappear, a horizontal line HL orthogonal to a falling direction of objects OB. Below the horizontal line HL, eight images indicating play operators included in play operators 1421 are positioned, the eight images corresponding to the eight columns. According a rule of the game, a player should operate an operator (one of the play operators 1421) at a time in which an object OB overlaps with the horizontal line HL, the operator corresponding to the column to which the object OB belongs.

In the lower portion of the game screen, there are shown images indicating the player's score, bonus points, and a level meter LM. The score is increased if, when an object OB overlaps with the horizontal line HL, an operation corresponding to the object OB is performed. The bonus points are added in a case in which the difference between the timing of the operation and the ideal timing of the operation is equal to or smaller than a predetermined range; and the bonus points are initialized to 0 once the difference exceeds the range. After the music ends, the bonus points are multiplied with a predetermined coefficient, and the product is added to the score. The level meter LM shows by length a skill level of a player computed in the game. In a case in which the skill level has reached a predetermined level at the end of music, it is determined that a stage has been cleared. A stage refers to a game period corresponding to one piece of music, and in one stage, a music piece for this stage is reproduced and the music sounds are output from speaker 16. One game includes one or a plurality of (a series of) stages. The number of stages comprised in one game varies depending on a selected game mode. One game is terminated when a player fails to clear a stage or when the player succeeds in clearing a game (i.e., in clearing the last stage).

Game modes include a one-piece-of-music mode (single-tune mode), an expert mode, a weekly ranking mode, and a level-certificate mode (level-recognition mode). In the one-piece-of-music mode, any one music piece can be selected for play from among a plurality of music pieces. The number of stages of a game in the one-piece-of-music mode, therefore, is one. In the expert mode, any course can be selected from among a plurality of courses. Each course has five stages, and the composition of stages varies depending on a course. The weekly ranking mode is a mode of playing a game in which a player can compete in scores in an ongoing weekly ranking. A game performed in the weekly ranking mode differs from the one-piece-of-music mode only in that a music piece is specified. In the level-certificate mode, a game level is set to a level of difficulty corresponding to a selected level. It is determined that a player has passed a certificate test for a target level if the game is cleared, and the player can then receive the certificate of the level.

No information relating to a play is displayed in game area R2 except that card 2 is used in the game, as will be described below in detail. In addition, when a double mode is selected, objects OB appear in both game areas R1 and R2, so that the objects OB fall along the total of 16 columns. In this case, eight images are positioned, below the line of game area R2, so as to correspond to eight columns of game area R2, the eight images indicating play operators included in play operators 1422. In other words, a player can operate not only play operators 1421 but also play operators 1422. Furthermore, in a case in which the two-player mode is selected, objects OB for the first player are displayed in game area R1, and objects OB for the second player are displayed in game area R2. In this case, images showing scores, bonus points, and a level meter are displayed in a lower portion of game area R2.

Processor 11 executes game program 185, so as to thereby function as a means for performing a comparison process described below.

Figure 5:
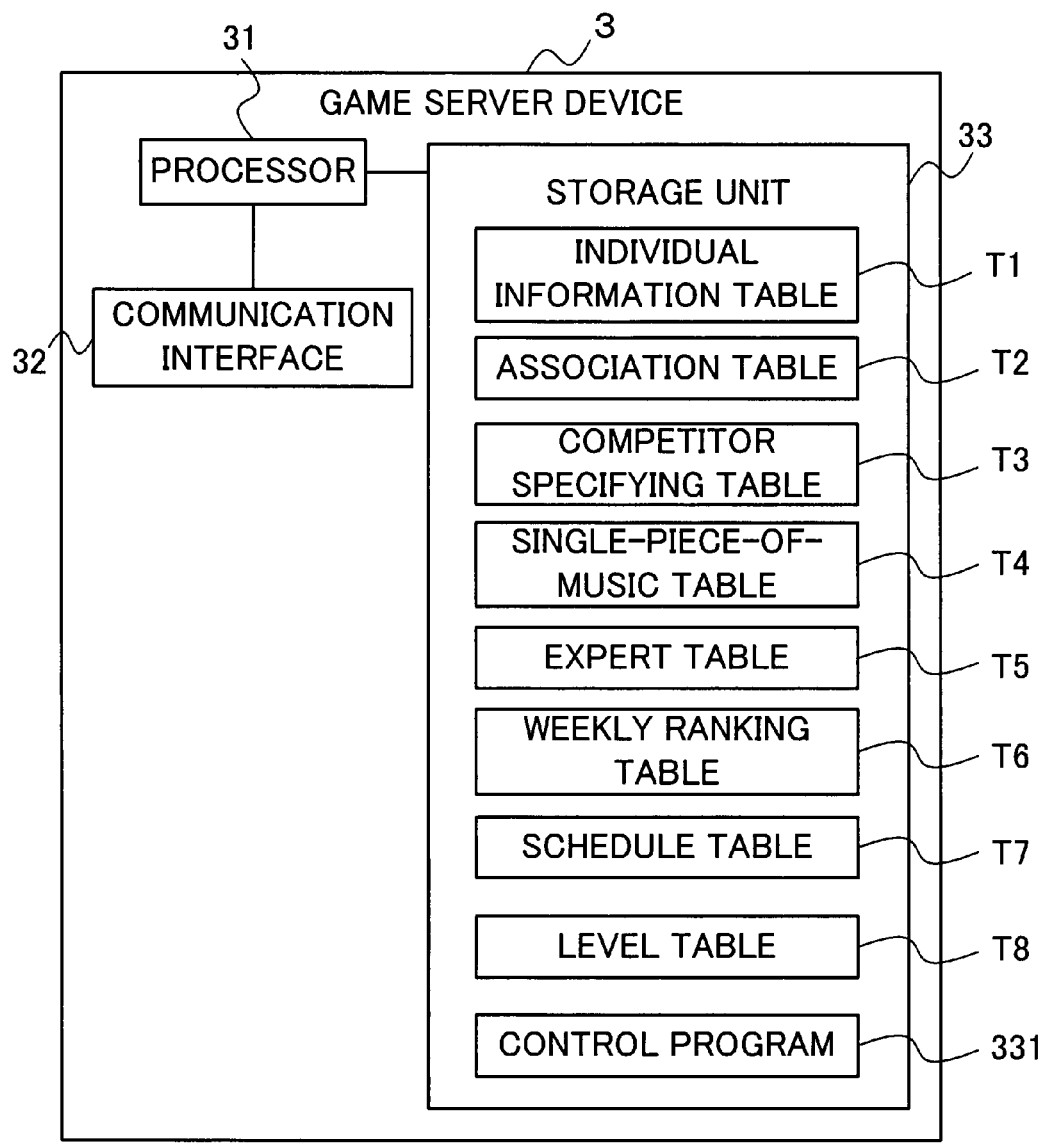
FIG. 5 is a block diagram showing a configuration of a game server device comprised in the communication system of FIG. 1.

FIG. 5 is a block diagram showing a configuration of game server device 3 comprised in the communication system. Game device 1 has a processor 31, a communication interface 32, and a storage unit 33. Communication interface 32 is connected to the Internet 5 directly or via a relay device such as a router and relays data between processor 31 and the Internet 5. Storage unit 33 has a ROM in which an IPL (Initial Program Loader) is written, has a RAM used as a work area and has a hard disk. There are stored on the hard disk an individual information table T1, an association table T2, a competitor specifying table T3, a single-piece-of-music table T4, an expert table T5, a weekly ranking table T6, a schedule table T7, and a level table T8.

Figure 6:
FIG. 6 is a diagram showing details of an individual information table in the game server device of FIG. 5.

FIG. 6 is a diagram showing the details of individual information table T1. The table is for associating private player identifiers, individual information, and public player identifiers, and each private player identifier has a record. A private player identifier identifies each one of a plurality of players. Individual information includes name information indicating the name of a player, and district information indicating the location of the player, and scores (points) of the player. A public player identifier is information for identifying each of a plurality of players. A private player identifier is information that must not be made open to the general public (excluding an operator of the game system), whereas a public player identifier is information that can be made open to the general public.

Figure 7:
FIG. 7 is a diagram showing details of an association table in the game server device of FIG. 5.

FIG. 7 is a diagram showing details of an association table T2 in game server device 3. This table is for associating multiple card IDs with a single private player identifier, and each card ID has a record. The table is used for converting a card ID into a private player identifier. This conversion is performed so that no updating of other tables is required for a new card 2 in a case in which an old card 2 is not functional due to it being damaged or deteriorated. The conversion is also performed so as to cope with a case in which one player owns more than one card 2 for use at game device 1, in preparation for the case of card 2 being disabled.

Figure 8:
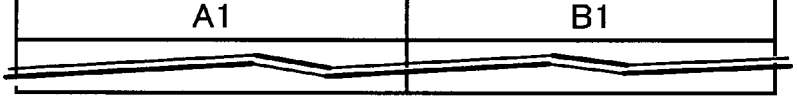
FIG. 8 is a diagram showing details of a competitor specifying table in the game server device of FIG. 5.

FIG. 8 is a diagram showing details of competitor specifying table T3 of game server device 3. This table is for associating a player and an competitor of the player, and a record is generated for each competitor relationship. In each record, a private player identifier is that of a player who has specified a competitor player, whereas a competitor private player identifier is a private player identifier of a competitor player who has been specified as a competitor by the player. In a case in which no player has specified a competitor, the number of records is 0.

FIG. 9 is a diagram showing details of single-piece-of-music table T4 of game server device 3. This table stores scores of games performed in the one-piece-of-music mode, each score being stored in association with a private player identifier of a player and a music number. There are stored in each record a private player identifier, a music number, a single-mode score, a double-mode score, a clear flag, a date of last update, and the number of plays. In each record, the music number is an identifier for identifying one of a plurality of music pieces, and the single-mode score is information indicating a score obtained when a player having a corresponding private player identifier plays a game of a music piece identified by the music number. The double-mode score is information indicating a score obtained when the player plays the game in the double mode, the clear flag is information whether the player has ever cleared the game in playing the game, the date of last update is a date on which this record is last updated, and the number of plays is information indicating the number of times which the player has played this game.

FIG. 10 is a diagram showing details of the expert table T5 of game server device 3. This table stores scores of games played in the expert mode, each score being stored in association with a set of a private player identifier, a course ID, and a mode ID. Each record stores a private player identifier, a course ID, a mode ID, a score, a clear flag, a date of last update, and the number of plays. The course ID is an identifier for identifying each of courses (i.e., the composition of stages) of the expert mode. Furthermore, the mode ID is an identifier for distinguishing the single mode or the double mode. In each record, the score is information indicating a score obtained when a player having a corresponding private player identifier plays a game under a course of the corresponding course ID in a mode of the corresponding mode ID, the clear flag is information whether the player has ever cleared the game in playing the game in the mode of the corresponding mode ID, the date of last update is a date on which this record is last updated, and the number of plays is information indicating the number of times which the player has played this game in the mode of the corresponding mode ID.

FIG. 11 is a diagram showing details of weekly ranking table T6 of game server device 3. This table stores scores of games of the weekly ranking mode, each score being associated with a set of a private player identifier, a week identifier, and a mode ID. Each record of this table differs from that of expert table T5 in that a week ID (described below) is stored instead of the course ID.

FIG. 12 is a diagram showing details of schedule table T7 of game server device 3. This table has a record indicating a ranking schedule for each weekly ranking. There are stored in each record a week ID, a music number, a start date, and an end date. In each record, the week ID indicates a week in which the weekly ranking is held, the music number indicates a music piece specified in the weekly ranking, the start date indicates the start date of the week, and the end date indicates the end date of the week. It should be noted that a period from the start date to the end date (a week) does not necessarily correspond to a calendar week.

FIG. 13 is a diagram showing details of level table T8 of game server device 3. In this table, a game result of the level-certificate mode is stored in association with a private player identifier of a player and a level ID. The level IDs are identifiers for identifying each of a plurality of levels. In each record of level table T8, the level ID indicates a level that a player having a corresponding private player identifier pursues to receive a certificate, and a pass or fail flag indicates whether the player has passed a certificate test of the level.

On the hard disk, there has been written a management program 331 that guides a view response process, a competitor registration response process, and a competitor candidate response process (described below). Processor 31 reads the IPL from ROM for execution, to thereby perform a process of reading management program 331 from the hard disk for execution. There is stored on the hard disk a control program that is executable at portable terminal 4, and processor 31, when it receives from portable terminal 4 a request for downloading the control program, identifies a private player identifier of a player that is using this portable terminal 4 to deliver the identified private player identifier and the control program to the requesting portable terminal 4. Examples of control programs that can be downloaded by the mobile internet access service and that can be executed by a portable terminal of this type are as follows: i-appli® for i-mode compatible portable terminals, an application program operable at a portable terminal in accordance with BREW® (Binary Runtime Environment for Wireless) developed by Qualcomm Incorporated, San Diego, Calif., USA, and an application program operable at a portable terminal in accordance with MIDP (Mobile Information Device Profile) for J2ME® CLDC (Java® 2 Micro Edition Connected Limited Device Configuration).

Figure 14:
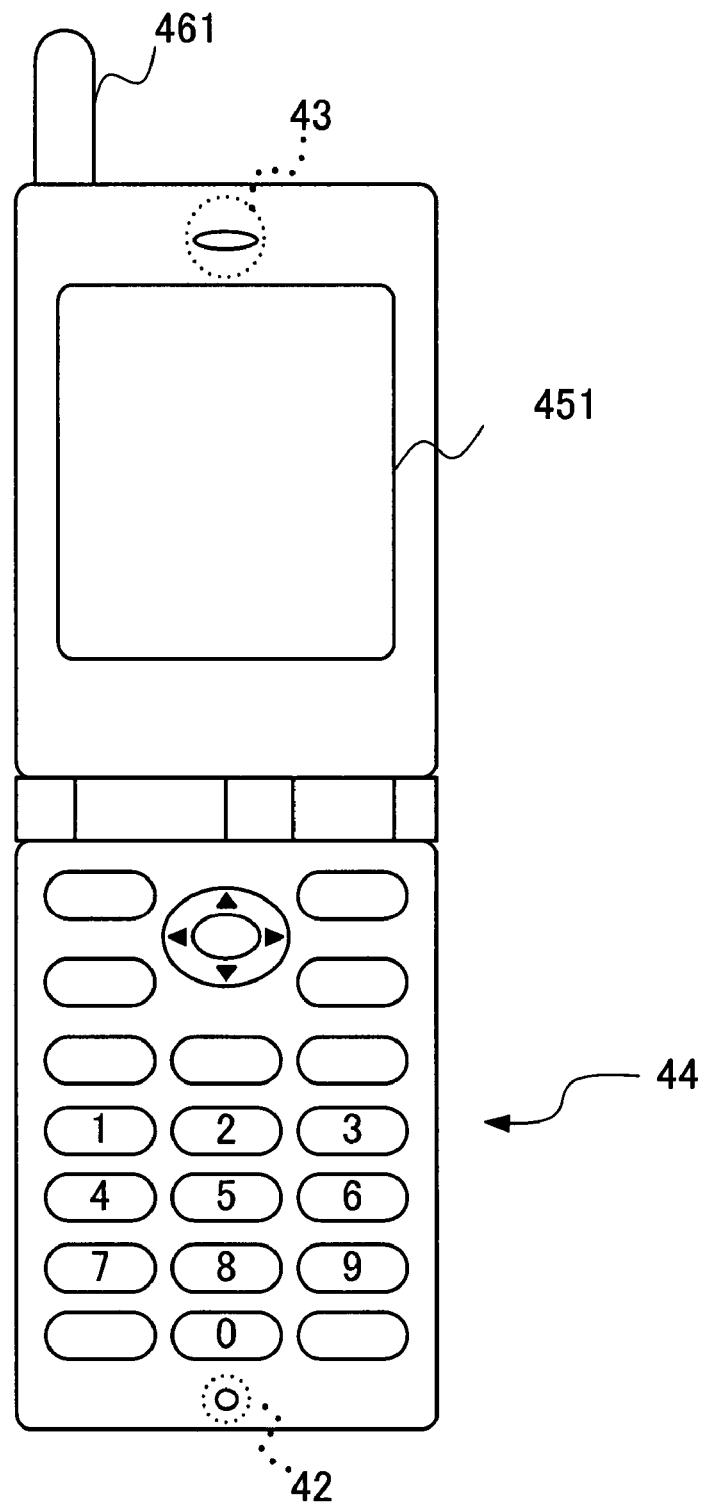
FIG. 14 is a diagram showing an external view of a portable terminal comprised in the communication system of FIG. 1.
Figure 15:
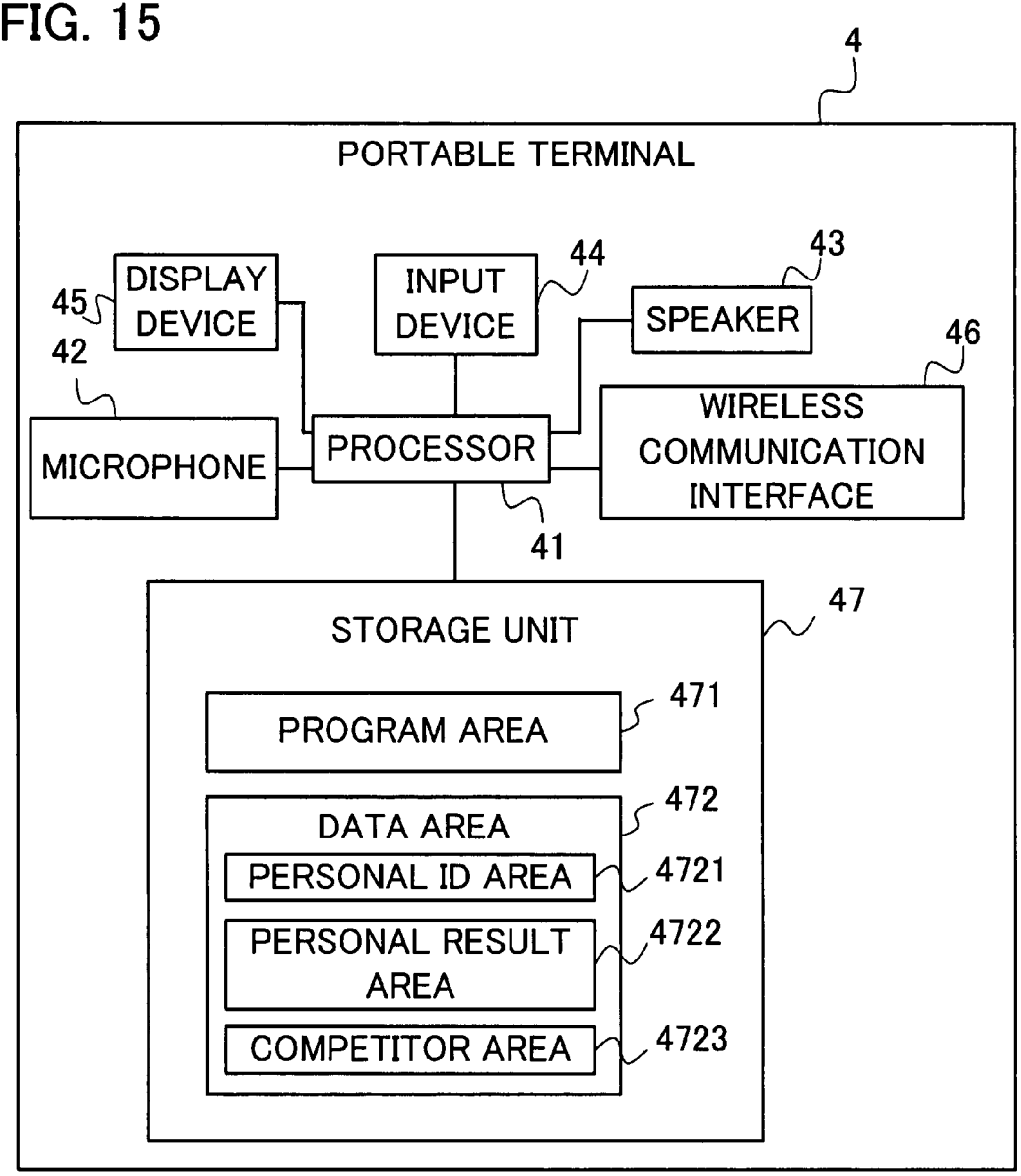
FIG. 15 is a block diagram showing a configuration of the portable terminal of FIG. 14.

FIG. 14 is a diagram showing an external view of portable terminal 4 comprised in the communication system, and FIG. 15 is a block diagram showing a configuration of portable terminal 4. As shown in these figures, portable terminal 4 has a processor 41, a microphone 42, a speaker 43, an input device (inputter) 44, a display device (display) 45, a wireless communication interface 46, and a storage unit 47.

Microphone 42 is used for voice communication, and it collects voice sounds of a user and supplies the collected sounds to processor 41.

Speaker 43 is used for voice communication, and it outputs sounds after receiving voice sound signals from processor 41.

Input device 44 has a plurality of buttons operated by a user, and when a button is pressed down, it supplies a signal unique to the pressed button to processor 41. The plurality of buttons includes a button used for inputting data and a button used for inputting instructions.

Display device 45 has a display area 451, and it displays a game screen in display area 451 after receiving image data from processor 41.

Wireless communication interface 46 has an antenna 461, and it relays data between processor 41 and base stations 61. Communication paths between wireless communication interface 46 and base stations 61 are wireless communication paths.

Storage unit 47 has a RAM, ROM, and EEPROM (Electrically Erasable Programmable ROM). There is stored in ROM an operating system of portable terminal 4, and the operating system is executed when portable terminal 4 is started. This operating system is for providing portable terminal 4 with a telephone communication function and a data communication function, a function of downloading other programs, and a function of executing a downloaded program. There are reserved in EEPROM a program area 471 for storing downloaded programs and a data area 472 corresponding to the program area 471. A program stored in program area 471 is only allowed to access data area 472. In a case in which a control program for guiding a later-described competitor monitoring process is stored in program area 471, data area 472 includes a personal ID area 4721, a personal result area 4722, and a competitor area 4723.

Operations:

In the following, description will be given of operations of the communication system having the above configuration. In this example, it is assumed that the above control program has already been written in program area 471 of portable terminal 4. Also, in personal ID area 4721 of portable terminal 4, a private player identifier (a private player identifier of a player who uses the control program) has been written, where the private player identifier is delivered from game server device 3 at the time of downloading the control program. Furthermore, it is assumed that a card ID of card 2 used in game device 1 has already been registered in association table T2.

Figure 16:
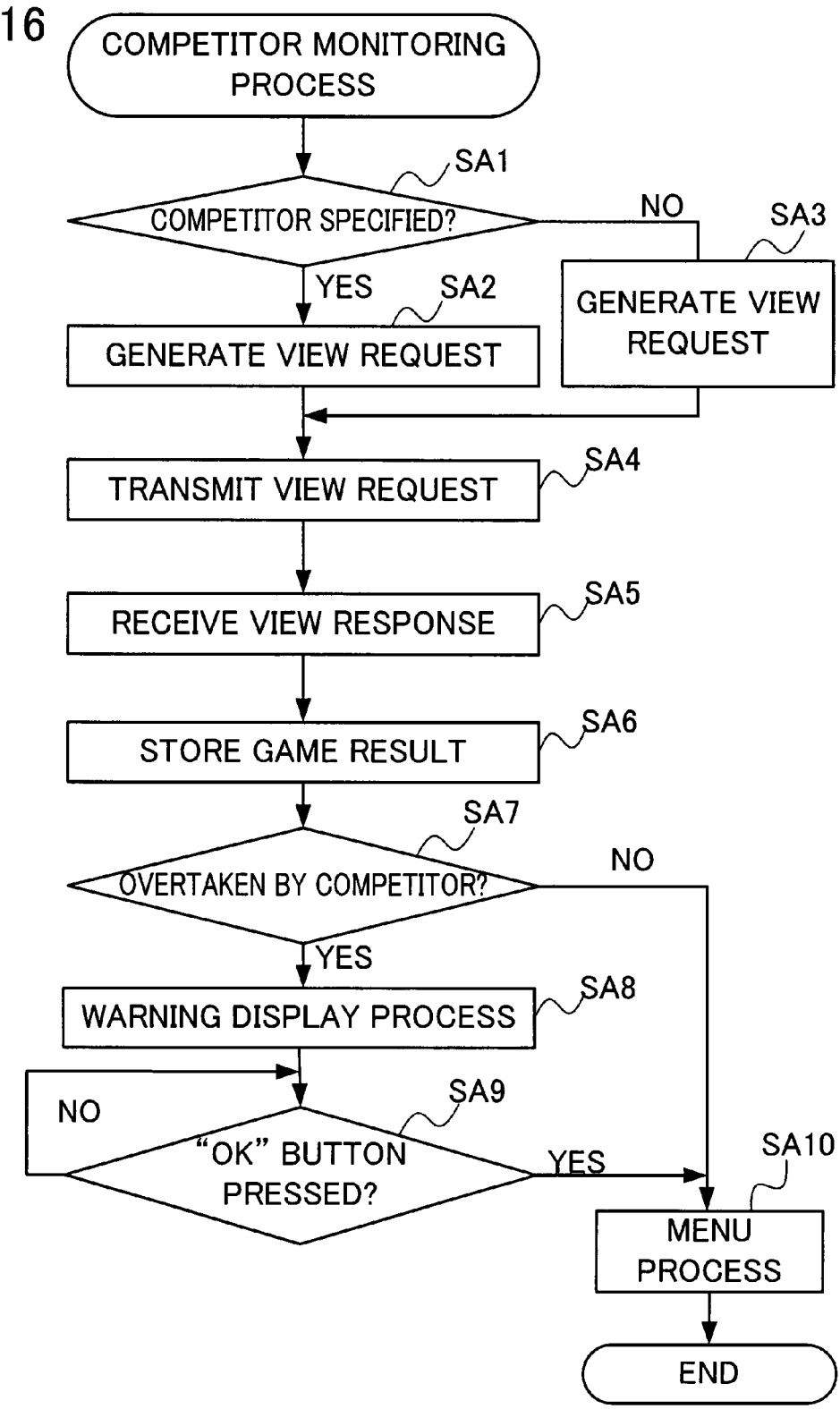
FIG. 16 is a flow chart showing a competitor monitoring process performed by a processor of the portable terminal of FIG. 15.

FIG. 16 is a flow chart of a competitor monitoring process performed by processor 41 of portable terminal 4. In the competitor monitoring process, processor 41 first determines whether a competitor is specified (Step SA1). This determination is performed by checking whether a private player identifier is stored in competitor area 4723. In a case in which the determination result changes to "YES", processor 41 generates a view request containing a private player identifier stored in personal ID area 4721 as a private player identifier of a requesting player and also containing a private player identifier stored in competitor area 4723 as a private player identifier of a competitor player (Step SA2). The view request is data that instructs that information showing a game result be transmitted as a reply. In a case in which the determination result changes to "NO", processor 41 generates a view request containing a private player identifier stored in personal ID area 4721 as a private player identifier of a requesting player and not containing a private player identifier of a competitor player (Step SA3). Processor 41 then transmits the generated view request to game server device 3 (Step SA4).

Figure 17:
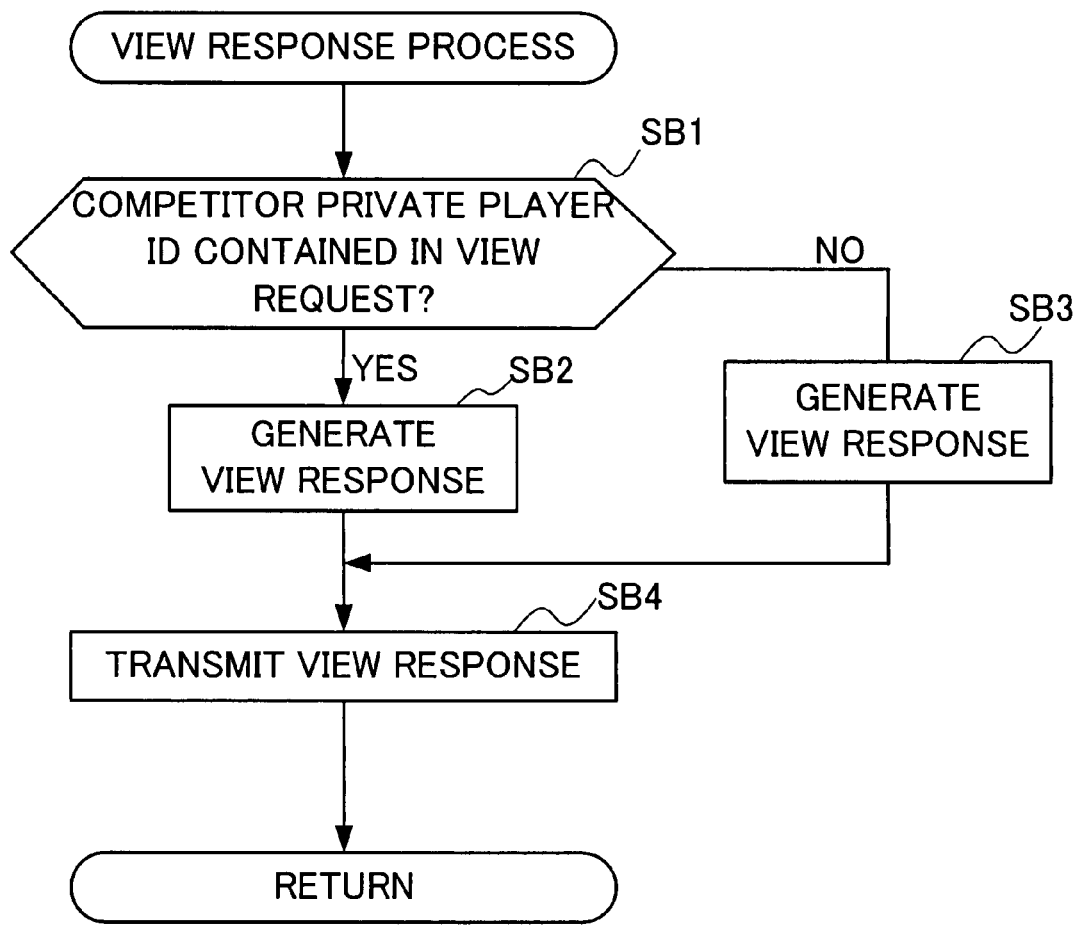
FIG. 17 is a flow chart showing a view response process performed by a processor of the game server device of FIG. 5.

FIG. 17 is a flow chart showing a view response process performed by processor 31 of game server device 3. Processor 31, when it receives a view request from portable terminal 4, determines whether the view request contains a private player identifier of a competitor player (Step SB1). In a case in which the determination result changes to "YES", processor 41 generates a view response using a private player identifier of a requesting player and that of a competitor player contained in the view request (Step SB2).

Specifically, for the private player identifier of the requesting player, a search is performed in tables T1, T4 to T6, and T8 for the private player identifier. All the data (a game result of the requesting player) stored in a hit record is then retrieved. For the private player identifier of the competitor player, a search is performed in tables T1, T5, T6, and T8 for the private player identifier. In this search, however, a range of the search performed in weekly ranking table T6 is limited to records corresponding to an ongoing weekly ranking. From among records hit in the search, the search is refined for records hit in level table T8 so that only records indicating a pass to the highest level will remain. All the data (a game result of the competitor player) stored in a thus obtained record is then retrieved. A view response containing the retrieved game results is then generated.

On the other hand, in a case in which a result of the determination of Step SB1 changes to "NO", processor 41 generates a view response using a private player identifier of a requesting player contained in the view request (Step SB3). Specifically, for the private player identifier of the requesting player, a search is performed in tables T1, T4 to T6, and T8 for the private player identifier, and all the data (a game result of the requesting player) stored in a hit record is retrieved. A view response is then generated so as to contain the retrieved game result.

Processor 31 subsequently replies to portable terminal 4 with the generated view response (Step SB4).

Processor 41 of portable terminal 4, upon receiving a view response from game server device 3 (Step SA5 of FIG. 16), stores the game result contained in the view response (Step SA6). Specifically, a game result of a requesting player contained in the view response is written in personal result area 4722. If there is a personal game result that has been written in personal result area 4722 prior to the writing of the game result contained in the view response, processor 41 performs a process of retaining only the last written personal game result as a previous personal game result. In a case in which the received view response contains a game result of a competitor player, processor 41 writes this game result in competitor area 4723 in association with a private player identifier of the competitor player. In a case in which, prior to this writing operation, a competitor game result has written in competitor area 4723, processor 41 performs a process of retaining only the last written competitor game result as the previous competitor game result.

Subsequently, processor 41 determines whether the requesting player has been overtaken by the competitor (Step SA7). Specifically, it is determined, in each of the expert mode, weekly ranking mode, and level-certificate mode, whether a score or a level contained in the previous personal game result exceeds a score or a level contained in the previous competitor game result and whether a score or a level contained in the personal game result of this time falls below a score or a level contained in the competitor game result of this time. It is to be noted that the present embodiment can be modified so that scores are used as an element of this determination. In a case in which a result of the determination changes to "YES" for at least one of the modes, a result of the determination of Step SA7 changes to "YES".

Figure 18:
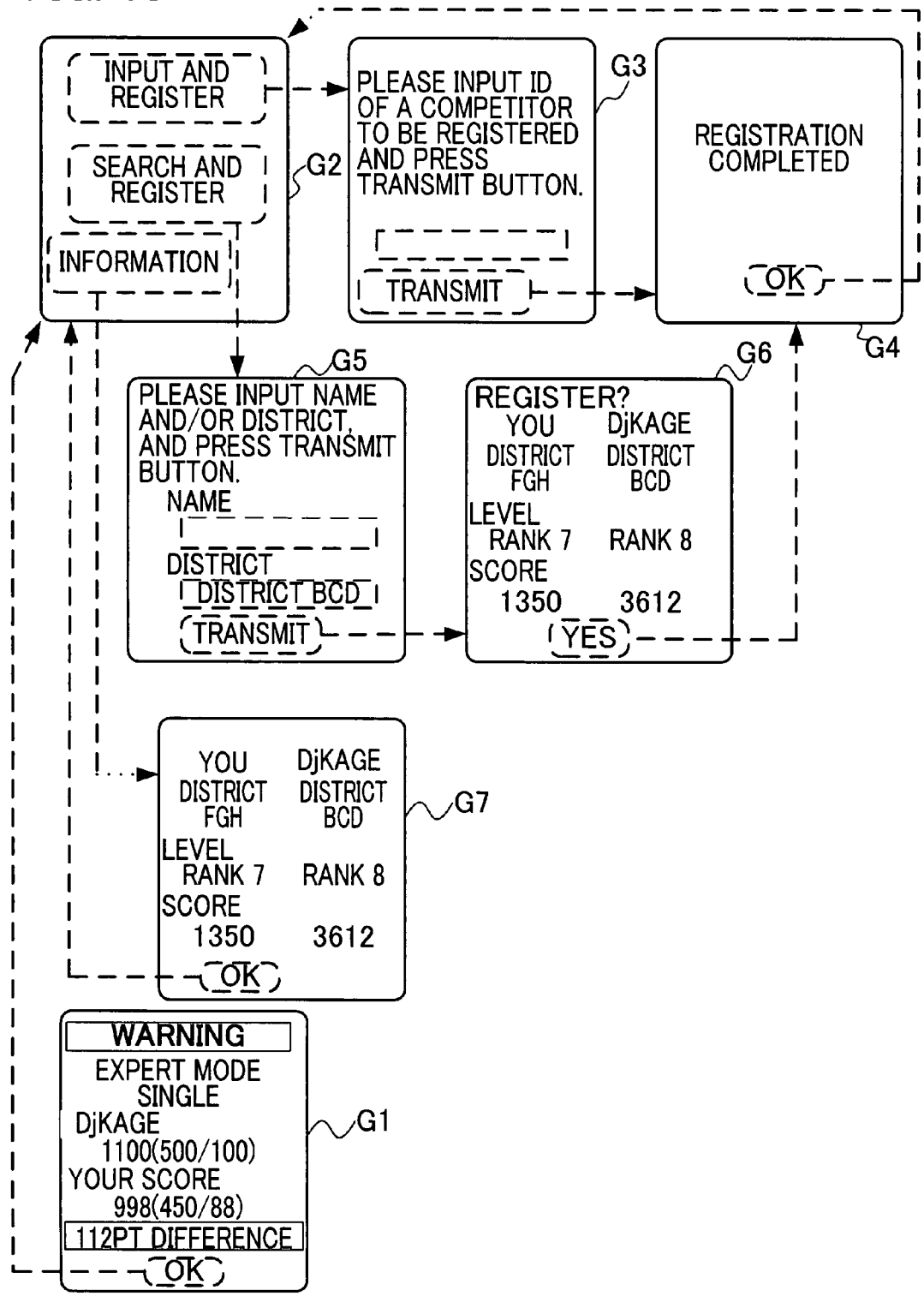
FIG. 18 is a diagram showing various display screens displayed on the portable terminal of FIG. 15.

In a case in which the result of the determination of Step SA7 is "YES", processor 41 displays on display device 45 a warning screen G1 notifying that the requesting player has been overtaken by the competitor (Step SA8). FIG. 18 is a diagram for describing various screen displayed on portable terminal 4, in which an example of the warning screen G1 is shown. The warning screen G1 shown in this figure stays on the display until an "OK" button on the screen is clicked on by the player (Step SA9: NO). When the player operates input device 44 to input an instruction of selecting the "OK" button (Step SA9: YES), processor 41 performs a menu process (Step SA10).

In the menu process, processor 41 first displays a menu screen G2 and waits for the player's instruction. An example of menu screen G2 is shown in FIG. 18. The menu screen G2 shown in this figure has three buttons. The first button is an "input and register" button for specifying a competitor by manually inputting a public player identifier of the competitor for registration; the second button is a "search and register" button for searching candidates for a competitor and specifying a competitor by selecting one of the search results for registration; and the third button is an "information" button for displaying a personal game result in contrast with a competitor game result.

In a case in which the player operates input device 44 to input an instruction of selecting the "input and register" button, processor 41 causes a screen G3 prompting for an input of a public player identifier of a competitor player to be displayed on display device 45. When the player inputs the public player identifier of the competitor player in a predetermined field of the screen by operating input device 44 and performs a further operation of inputting an instruction of selecting a "transmit" button of the screen, processor 41 generates a competitor registration request containing the input public player identifier and the private player identifier stored in the personal ID area for transmission to game server device 3. The competitor registration request is data that instructs that a player indicated by the public player identifier be registered as a competitor of the requesting player.

Figure 19:
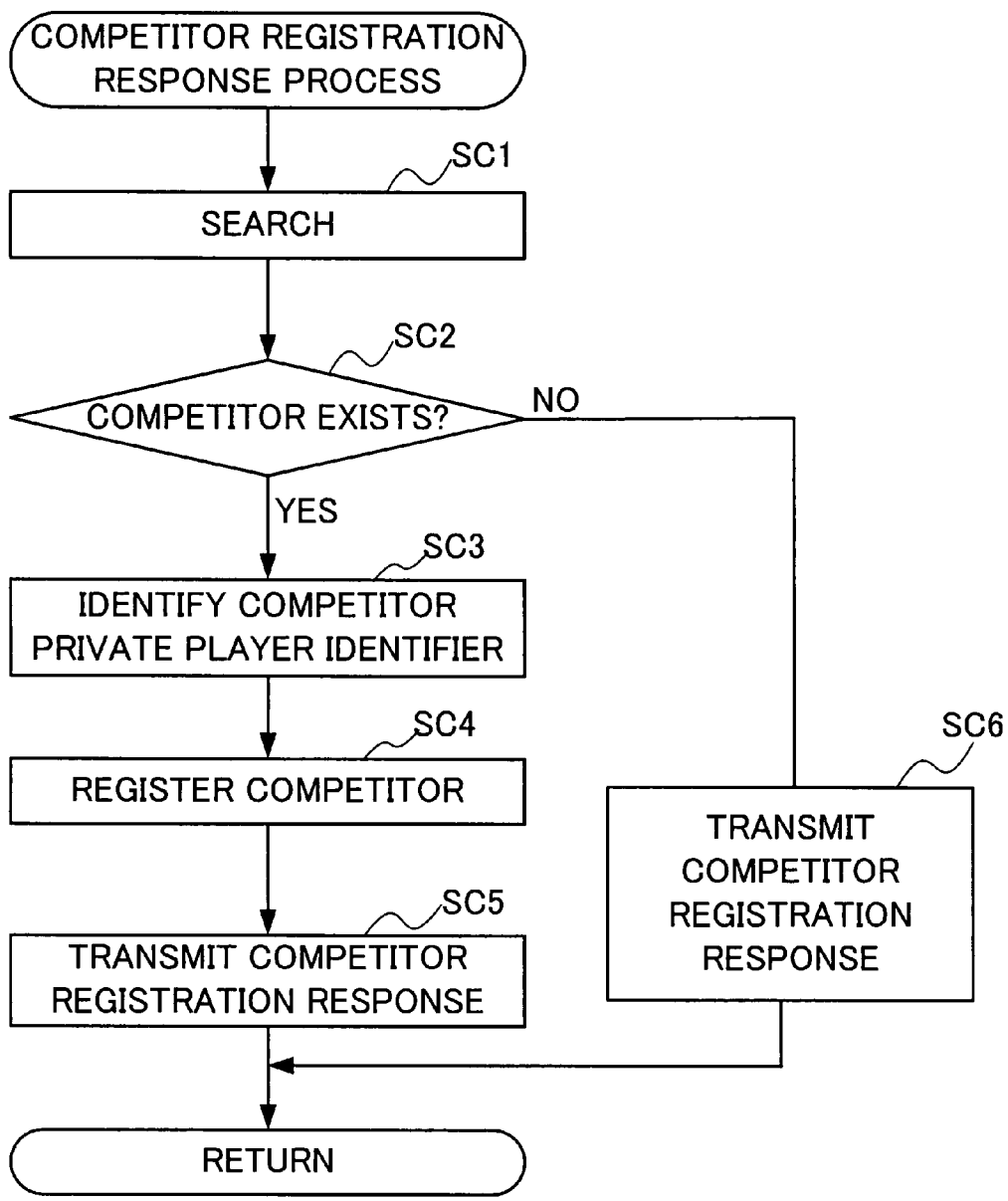
FIG. 19 is a flow chart showing a competitor registration response process performed by the processor of the game server device of FIG. 5.

FIG. 19 is a flow chart showing a competitor registration response process performed by processor 31 of game server device 3. Processor 31 performs a competitor registration response process upon receiving the above competitor registration request. In the competitor registration response process, processor 31 first searches in individual information table T1 for a public player identifier contained in the received competitor registration request (Step SC1). Processor 31 then determines whether there is any record hit in this search, i.e., whether a competitor specified is a real player (Step SC2). In a case in which a result of the determination is "YES", a private player identifier stored in association with the public player identifier is identified as a competitor private player identifier (Step SC3). Processor 31 then stores, in association table T2, a record associating the identified private player identifier as a competitor private player identifier with the private player identifier contained in the competitor registration request, thereby registering a competitor (Step SC4). Processor 31 then replies portable terminal 4 with a competitor registration response containing the identified private player identifier (Step SC5). The competitor registration request is data indicating that the registration of a competitor is completed. On the other hand, in a case in which a result of the determination of Step SC2 changes to "NO", processor 31 replies portable terminal 4 with a competitor registration response indicating that the registration could not be completed (Step SC6).

Processor 41 of portable terminal 4, upon receiving a competitor registration response indicating that the registration is completed, stores in competitor area 4723 the private player identifier contained in the competitor registration response in association with the public player identifier contained in the above competitor registration request. Processor 41 then causes a screen G4 notifying that the registration is completed to be displayed on display device 45. When the player then operates input device 44 to input an instruction of selecting an "OK" button on the screen, processor 41 causes a menu screen G2 to be displayed. On the other hand, in a case in which a competitor registration response indicating that the registration was unsuccessful is received, a screen indicating that the registration was unsuccessful is displayed for a certain period before menu screen G2 is displayed.

When the player operates input device 44 to input an instruction of selecting the "search and register" button, processor 41 causes a screen G5 prompting for an input of search conditions for competitor candidates to be displayed on display device 45. In screen G5, a name of a competitor and a district indicating a competitor's location can be input as search conditions. When the player operates input device 44 to input desired search conditions and to input an instruction for selecting a "transmit" button of the screen, processor 41 transmits, to game server device 3, a competitor candidate request containing the input search conditions and the private player identifier stored in the personal ID area. The competitor candidate request is data instructing that data on candidates of players who can be compared with the request player be transmitted as a response.

Figure 20:
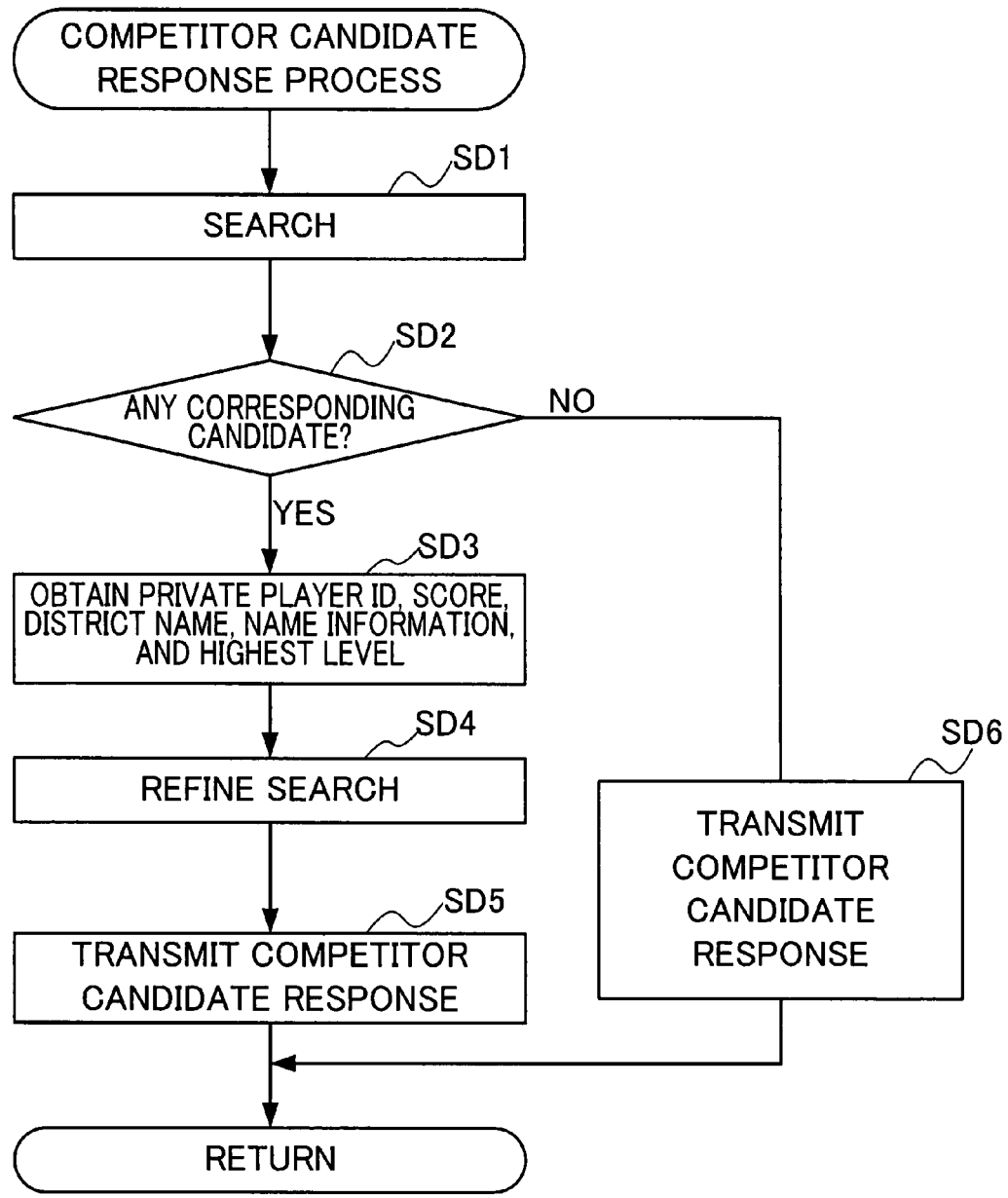
FIG. 20 is a flow chart showing a competitor candidate response process performed by the processor of the game server device of FIG. 5.

FIG. 20 is a flow chart showing a competitor candidate response process performed by processor 31 of game server device 3. Processor 31 performs a competitor candidate response process upon receiving the competitor candidate request. In the competitor candidate response process, individual information table T1 is searched with search conditions contained in the received competitor candidate request (Step SD1). For example, in a case in which a name is specified as a search condition, a record having name information including a character string indicating the specified name is searched; in a case in which a district is specified as a search condition, a record having district information including a character string indicating the specified district as a part is searched; and in a case in which both a name and a district are specified as search conditions a record having name information including a character string indicating the specified name and also having district information including a character string indicating the specified district as a part is searched.

Subsequently, it is determined whether there is any record hit in this search, i.e., whether there is any competitor candidate fulfilling the specified search condition(s) (Step SD2). In a case in which the determination result is "YES", processor 31 extracts a private player identifier(s) from the hit record(s) and refers to a record(s) corresponding to the private player identifier(s) in individual information table T1 and level table T8 to obtain a score, a district name, name information, and the highest level for each private player identifier (Step SD3). Subsequently, processor 31 obtains the highest level corresponding to the private player identifier contained in the competitor candidate request, and competitor candidates are narrowed down by specifying a private player identifier(s) whose highest level(s) falls within a predetermined range with the obtained highest level as center or a standard (Step SD4). Processor 31 then generates a competitor candidate response containing the specified private player identifier(s) and a score, a district name, a highest level, and name information corresponding to each of the specified private player identifiers, i.e., information relating to competitor candidates, for transmission to portable terminal 4 (Step SD5). On the other hand, in a case in which a result of the determination of SD2 changes to "NO", processor 31 replies to portable terminal 4 with a competitor candidate response indicating that there are no competitor candidates fulfilling the conditions (Step SD6). Competitor candidates can be narrowed down instead by selecting a predetermined number of competitors whose last update date is close to the current date.

Processor 41 of portable terminal 4, upon receiving a competitor candidate response, causes a screen G6 to be displayed on display device 45, the screen G6 giving information contained in the competitor candidate response in contrast to a personal game result of this time stored in personal result area 4722. FIG. 18 shows an example of screen G6. This example shows a case in which the number of competitor candidates whose information is contained in the competitor candidate response is 1. In a case in which there are multiple competitor candidates, the player is able to select among competitors candidates whose information is displayed. Furthermore, screen G6 is a screen for asking the player whether to register the displayed competitor candidate as a competitor. Therefore, when the player operates input device 44 to input an instruction of selecting an "YES" button of the screen, processor 41 generates a competitor registration request for transmission to game server device 3 in the same way as it was done when the instruction of selecting the "transmit" button is input in screen G3. However, the competitor registration request generated in this case contains a private player identifier of a competitor player instead of a public player identifier of a competitor player. Hereinafter, a process that is the same as the competitor registration response process of FIG. 19 is performed at game server device 3, except that Steps SC1 to SC3 are skipped since a private player identifier is contained in the competitor registration request in this case and except that a step of registering a competitor and a step of transmitting a competitor registration response (Steps SC4 and SC5) are performed. Subsequently, a screen G4 is displayed at portable terminal 4.

In a case in which the player operates input device 44 to input an instruction for selecting the "information" button, processor 41 determines whether a competitor is specified. Processor 41 performs no process in a case in which no competitor is specified, whereas, in a case in which a competitor is specified, processor 41 causes a screen G7 to be displayed on display device 45, the screen G7 for notifying a personal game result of the time stored in personal result area 4722 in contrast with a competitor game result of this time stored in competitor area 4723. FIG. 18 shows an example of screen G7. This example shows a case in which the number of specified competitors is 1, and, in a case in which there are multiple competitors, the player is able to select among competitors whose information is displayed. When the player operates input device 44 to input an instruction of selecting an "OK" button of the screen G7, processor 41 causes menu screen G2 to be displayed.

In a case in which the player operates input device 44 to input an instruction for forcible termination, processor 41 terminates a menu process regardless of the type of screen displayed at the time of the instruction. As a result, the competitor monitoring process is terminated.

Figure 21:
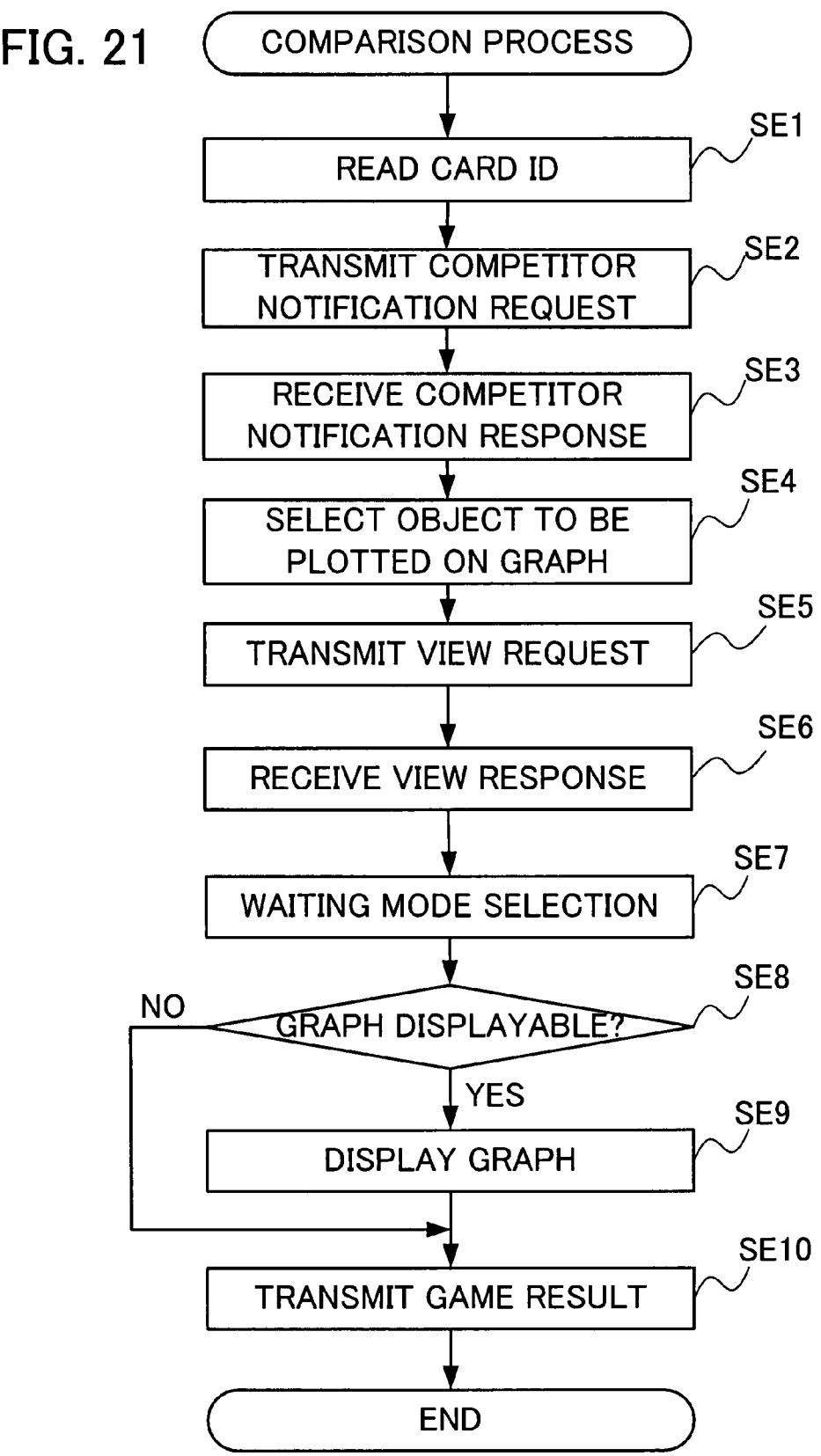
FIG. 21 is a flow chart showing a comparison process performed by a processor of the game device of FIG. 2.

FIG. 21 is a flow chart showing a comparison process performed by processor 11 of game device 1.

Processor 11 of game device 1 starts a comparison process when card 2 is inserted from card acceptance slot 131. In the comparison process, processor 11 first causes card reading device 13 to read a card ID from card 2 (Step SE1).

Processor 11 then generates a competitor notification request containing the card ID read by card reading device 13 for transmission to game server device 3 (Step SE2). The competitor notification request requests game server device 3 to transmit as a response a private player identifier of a competitor player registered in association with a private player identifier of the requesting player. The competitor notification request differs considerably from the above view request in that it contains a card ID instead of a private player identifier of the requesting player.

Processor 31 of game server device 3 replies with a competitor notification response upon receiving a competitor notification request from game device 1. However, since the competitor notification request contains a card ID instead of a private player identifier of the requesting player, processor 31 performs a process of identifying a private player identifier of the requesting player corresponding to the card ID contained in the competitor notification request by referring to association table T2, before identifying, in competitor specifying table T3, one or a plurality of competitor private player identifiers that are in association with the private player identifier. Processor 31 then transmits to game device 1 a competitor notification response containing a competitor private player identifier(s). At this stage, the competitor notification response does not contain a game result of a competitor player. Furthermore, at this stage, a private player identifier of a top player in the one-piece-of-music mode is contained in the competitor notification response, where the top player is a player who has gained the highest score in past game results in the game system of FIG. 1.

Figure 22:
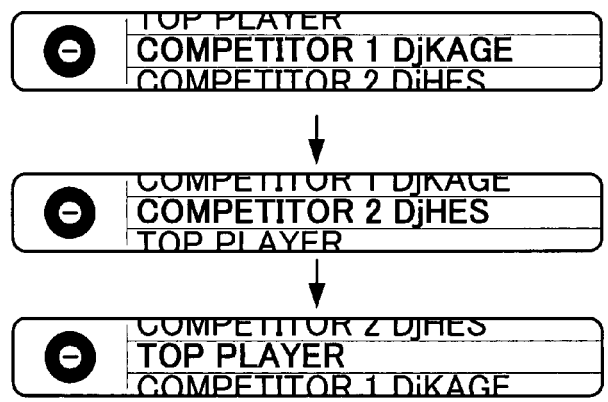
FIG. 22 is a diagram for describing changes of images displayed on the game device of FIG. 2.

Processor 11 of game device 1, upon receiving a competitor notification response returned from game server device 3, writes the information contained in the competitor notification response into a corresponding area (top player score area 183 and competitor result area 184) (Step SE3). Subsequently, processor 11 performs a process of prompting a player who owns card 2 to select an object (a game result of another player) to be plotted on a graph, so that the game result of another player is compared with the player's own result (Step SE4). FIG. 22 shows a diagram for describing changing images displayed on game device 1, and is an example of an image for having the player to select the object to be plotted on a graph (a result of another player). In the process of prompting the user to select the object to be made into a graph, an image shown as an example in FIG. 22 is displayed on display device 15. An item candidate displayed in a middle line of each image is an item candidate that is provisionally selected, and the provisionally selected item candidate is determinately selected when a predetermined operator is operated. The player switches an item candidate that is being provisionally selected by rotating a dial, as indicated by arrows in the figure. When the predetermined operator is operated in a state in which a desired item candidate is provisionally selected, the desired item candidate is determinately selected as an item. Individual competitor players and a top player can be item candidates.

When a desired item is determinately selected by the player, processor 11 stores the selected item. Processor 11 also generates a view request containing a private player identifier corresponding to the selected item for transmission to game server device 3 (Step SE5). Processor 31 of game server device 3, upon receiving a view request from game device, performs a process that is the same as the view response process of FIG. 17 and generates a view response for reply. In this case, a view response generated by processor 31 contains a game result corresponding to the private player identifier contained in the view request from game device 1, when the private player identifier is that of a competitor or of a top player. Furthermore, when the view response is generated, a search is performed in single-piece-of-music table T4 for a record having a private player identifier of the requesting player; and therefore, a game result having reflected this search result is contained in the view response.

Processor 11 of game device 1, upon receiving a view response transmitted from game server device 3, writes information contained in the view response in a corresponding area (personal result area 182, a top player score area 183, and competitor result area 184) (Step SE6).

Figure 23:
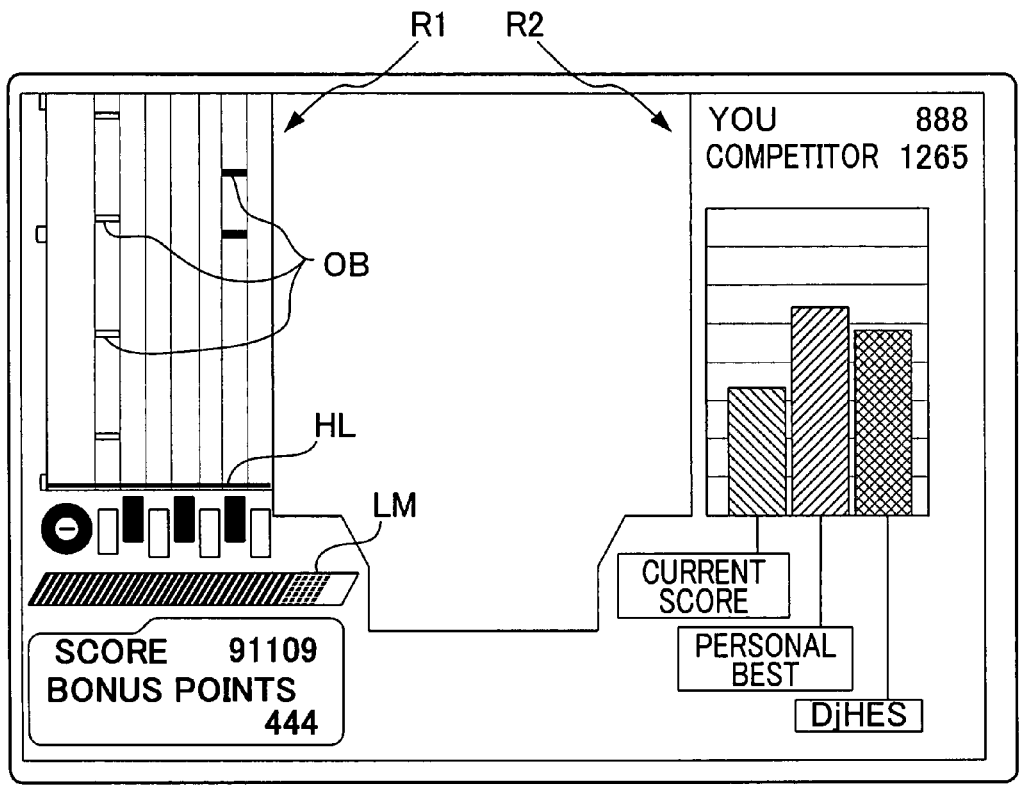
FIG. 23 is a diagram showing an example of a game screen displayed on the game device of FIG. 2.

Subsequently, processor 11 waits for various modes relating to the game such as a play mode, a game mode, and an operation mode to be selected (Step SE7). When these modes are selected, it is determined whether the single-player mode, the single mode, and the one-piece-of-music mode are selected, i.e., whether it is possible to use game area R2 for displaying a graph (Step SE8). In a case in which the determination changes to "YES", processor 11 displays in game area R2 a graph showing various scores in contrast with one another as shown in FIG. 23 (Step SE9). FIG. 23 is a diagram showing an example of a game screen displayed on game device 1. From among the bars included in the graph, the left bar shows a score of a game currently being played, and its length is changeable during the game. The center bar shows the highest score (personal best score) which the player has ever obtained in the past, and the right bar shows a score of an item selected in Step SE4. The lengths of the center and the right bars never change during the game play. Each score corresponds to a mode of a game that is being played.

When the game is completed, processor 11 transmits a game result of the finished play to game server device 3 (Step SE10), thereby completing the comparison process. Game server device 3 receives a game result from game device 1 and updates corresponding tables as appropriate so that this game result is reflected. Thus, data stored in game server device 3 is kept updated.

A player's being provided with information regarding game situations such as the player being overtaken by a competitor in a game result or a game result of the player closing in on or falling behind that of a competitor could lead to increased motivation for the player to use game device 1. As described above, since portable terminal 4 is used as a terminal device in the present embodiment, such information that could lead to increased motivation can be conveyed to the player regardless of time and place. Therefore, according to the present embodiment, it is possible to attract a player as a customer to visit a shop to play, which could lead to increased frequency of using game device 1 by the player. As a result, a utilization rate (an amount of time in which game device 1 is used by players divided by an amount of time in which game device 1 can be used by players) of game device 1 and a productivity (profit from a game device 1 per unit time) of game device 1 are expected to rise. Furthermore, according to the present embodiment, it is possible, using game device 1, to provide to a player who is playing a game information that could lead to increased motivation. In this case, it is possible to give a player a realistic sensation of being engaged in a contest with a competitor while playing, which leads to increased desire to play or "gameworthiness".

In the foregoing, description has been given of the present embodiment. However, it is possible to modify the present embodiment such that an IC card is used as the above card. In this modification, in an IC card, a private player identifier of a user of the IC card and a private player identifier of a player specified by the user as a competitor may be stored. When the IC card is set to a game device, the game device may read, from the set IC card, the private player identifier of the competitor player for transmission to a server device, so as to thereby obtain a game result of a competitor.

The invention claimed is:

1. A game system having a plurality of game devices, a game server device that communicates with said game devices to obtain results of a game for each of a plurality of players, and a plurality of terminal devices operated individually by at least one of said players,
    wherein said game server device comprises a storage unit that stores a player identifier for identifying each of said players in association with a recording medium identifier for identifying an information recording medium used by said each player in playing said game device, that stores said player identifier in association with result information indicating a game result, and that stores a player identifier of one of said players in association with a player identifier of another of said players, said another player being specified by said one player;
    wherein each of said game devices comprises:
    a reader that reads said recording medium identifier from said information recording medium;
    a generator that generates said result information according to a game result; and
    a transmitter that transmits said result information and said recording medium identifier to said game server device;
    wherein each of said terminal devices comprises:
    a display;
    an inputter that receives player's instructions;
    an identifying unit that identifies said player identifier of said another player when said one player specifies said another player by operating said inputter;
    a player-identifier storage that stores said player identifier of said one player;
    a registration requester that generates a registration request containing said player identifier of said one player and said player identifier of said another player identified by said identifying unit and instructing that said another player be registered in association with said one player, said registration request then being transmitted to said game server device;
    a view requester that generates a view request containing said player identifier of said one player and instructing that said result information of said another player be transmitted as a response, said view request then being transmitted to said game server device, registration of said another player having been instructed by said registration requester, with said registration being made in association with said one player; and
    a response processor that, upon receiving from said game server device a view response containing result information of said another player, causes said result information to be displayed on said display, registration of said another player having been instructed so that said another player is registered in association with said one player and said view response being a response to said view request; and
    wherein said game server device executes:
    a process of, upon receiving from one of said game devices said result information and said recording medium identifier, storing in said storage unit said result information in association with a player identifier corresponding to said recording medium identifier;
    a process of, upon receiving said registration request from one of said terminal devices, storing in said storage unit said player identifier of said one player and said player identifier of said another player in association with each other, said player identifier of said one player and said player identifier of said another player being contained in said registration request; and
    a process of, upon receiving said view request from one of said terminal devices, obtaining said player identifier of said another player corresponding to said player identifier of said one player contained in said view request, obtaining said result information corresponding to said player identifier of said another player, and transmitting said result information to said terminal device,
    wherein the game devices are arcade game devices; and
    wherein the terminal devices are mobile communication terminals.

2. A game system according to claim 1,
    wherein the terminal devices include a terminal device of the one player, and the response processor compares the result information of the another player with result information of the one player, and based on the comparison, the response processor determines whether the one player is overtaken by the another player in the game result.

3. A game server device for communicating with a plurality of game devices to obtain results of a game for each of a plurality of players, and for communicating with a plurality of terminal devices operated individually by at least one of said players,
    the game server device comprising:
    a storage unit that stores a player identifier for identifying each of the plurality of players in association with result information indicating a game result of said each player, and that stores said player identifier of one of said players in association with a player identifier of another of said players, said another player being specified by said one player;

a registrator that, upon receiving from one of said terminal devices a registration request containing said player identifier of said one player and said player identifier of said another player, with said registration request instructing that said another player be registered in association with said one player, registers in said storage unit said player identifier of said another player in association with said player identifier of said one player;

a first obtainer that, upon receiving from said terminal device a view request containing said player identifier of said one player and instructing that result information of said another player be registered by said registrator in association with said one player be transmitted as a response, identifies said player identifier of said another player registered in association with said player identifier of said one player to obtain from said storage unit result information in association with said identified player identifier of said another player; and a first replier that transmits to said terminal device a view response containing said obtained result information as a response to said view request, wherein the game devices are arcade game devices; and wherein the terminal devices are mobile communication terminals.

4. A game server device according to claim 3, further comprising:

a second obtainer that, upon receiving from said terminal device a candidate request containing said player identifier of said one player and instructing that candidates for a player to be compared with said one player be transmitted as a response, obtains from said storage unit result information corresponding to said player identifier of said one player contained in said candidate request;

a searcher that performs a search in said storage unit for retrieval of a player identifier of one or a plurality of other players whose game result falls within a predetermined range with said obtained result information as a standard; and a second replier that generates a candidate response containing a player identifier retrieved by said searcher or a candidate response containing information that no player identifier has been retrieved by said searcher, said candidate response then being transmitted to said terminal device as a response to said candidate request.

5. A game server device according to claim 4, wherein said searcher obtains from said storage unit said result information corresponding to said retrieved player identifier; and wherein said second replier generates said candidate response containing said player identifier and said result information and transmits said candidate response to said terminal device as a response to said candidate request.

6. A game server device according to claim 3, wherein said storage unit has stored said player identifier being in association with name information indicating a name of each of said players, said game server device further comprising:

a searcher that, upon receiving from said terminal device a candidate request containing name information and instructing that candidates for a player to be compared with said one player be transmitted as a response, performs a search in said storage unit for retrieval of a player identifier corresponding to said name information contained in said candidate request; and a second replier that generates a candidate response containing said player identifier retrieved by said searcher or a candidate response containing information that no player identifier has been retrieved by said searcher, said candidate response then being transmitted to said terminal device as a response to said candidate request.

7. A game server device according to claim 6, wherein said searcher obtains from said storage unit said result information corresponding to said retrieved player identifier; and wherein said second replier generates said candidate response containing said player identifier and said result information and transmits said candidate response to said terminal device as a response to said candidate request.

8. A game server device according to claim 3, wherein said storage unit has stored said player identifier in association with district information indicating a district indicating a location of said each player, said game server device further comprising:

a searcher that, upon receiving from said terminal device a candidate request containing district information and instructing that candidates for a player to be compared with said one player be transmitted as a response, performs a search in said storage unit for retrieval of a player identifier corresponding to said district information contained in said candidate request; and a second replier that generates a candidate response containing said player identifier retrieved by said searcher or a candidate response containing information that no player identifier has been retrieved by said searcher, said candidate response then being transmitted to said terminal device as a response to said candidate request.

9. A game server device according to claim 8, wherein said searcher obtains from said storage unit said result information corresponding to said retrieved player identifier; and wherein said second replier generates said candidate response containing said player identifier and said result information and transmits said candidate response to said terminal device as a response to said candidate request.

10. A terminal device that communicates with a game server device which communicates with a plurality of game devices to obtain result information indicating a game result for each of a plurality of players and to store a player identifier for identifying each of said players in association with result information of said each player, said terminal device comprising:

a display;

an inputter that receives instructions from one of said players;

an identifying unit that, when said one player specifies another of said players by operating said inputter, identifies a player identifier of said another player;

a player-identifier storage that stores a player identifier of said one player; and a registration requester that generates a registration request containing said player identifier of said one player and said player identifier of said another player identified by said identifying unit, said registration request then being transmitted to said game server device, wherein the game devices are arcade game devices; and wherein the terminal device is a mobile communication terminal.

11. A terminal device according to claim 10, wherein said identifying unit performs a process of causing a screen prompting for an input of said player identifier of said another player to be displayed on said display and a process of obtaining said player identifier of said another player input by said inputter.

12. A terminal device according to claim 11, further comprising:
a view requester that generates a view request containing said player identifier of said one player read from said player-identifier storage and instructing that result information of said another player be transmitted as a response, said view request then being transmitted to said game server device, registration of said another player having been instructed by said registration requester, with said registration being made in association with said one player; and
a response processor that, upon receiving from said game server device a view response containing said result information of said another player corresponding to said one player, with said view response being a response to said view request, causes said result information to be displayed on said display, registration of said another player having been instructed so that said another player is registered in association with said one player.

13. A terminal device according to claim 11, further comprising:
a view requester that generates a view request containing said player identifier of said one player read from said player-identifier storage and instructing that result information of said another player be transmitted as a response, said view request then being transmitted to said game server device, registration of said another player having been instructed by said registration requester so that said another player is registered in association with said one player;
a result-information storage that stores said result information of said another player, registration of said another player having been instructed so that said another player is registered in association with said one player;
a writer that, upon receiving from said game server device a view response as a response to said view request, said view response containing result information of said one player and said result information of said another player, writes in said result information storage said result information of said one player and said result information of said another player, registration of said another player having been instructed so that said another player is registered in association with said one player;
a reader that, upon receiving said view response from said game server device, reads from said result-information storage said result information of said one player and said result information of said another player stored as of the time a view response immediately previous to said view response was received, registration of said another player having been instructed so that said another player is registered in association with said one player;
a determiner that determines, as conditions for determination, whether said result information of said one player read by said reader exceeds said result information of said another player read by said reader and whether said result information of said one player contained in said received view response falls below said result information of said another player contained in said received view response, registration of said another player having been instructed so that said another player is registered in association with said one player; and a response processor that, in a case in which said determination conditions are found to be affirmative, causes said result information of said another player to be displayed on said display, registration of said another player having been instructed so that said another player is registered in association with said one player.

14. A terminal device according to claim 10,
wherein said game server device has stored said player identifier and name information indicating a name of said each player stored in association with each other,
said terminal device further comprising a candidate requester that generates, in accordance with operations of said inputter, a candidate request containing said player identifier of said one player and instructing that candidates for a player to be compared with said one player be transmitted as a response, said candidate request then being transmitted to the game server device,
wherein said identifying unit performs:
a process of, upon receiving from said game server device a candidate response containing a player identifier specifying a candidate for a player to be compared with said one player and also containing name information, said candidate response being a response to said candidate request, causing said candidate to be displayed on said display on the basis of said name information; and
a process of, when said one player uses said inputter to select said candidate displayed on said display, identifying a player identifier corresponding to said selected candidate as said player identifier of said another player.

15. A terminal device according to claim 14, further comprising:
a view requester that generates a view request containing said player identifier of said one player read from said player-identifier storage and instructing that result information of said another player be transmitted as a response, said view request then being transmitted to said game server device, registration of said another player having been instructed by said registration requester, with said registration being made in association with said one player; and
a response processor that, upon receiving from said game server device a view response containing said result information of said another player corresponding to said one player, with said view response being a response to said view request, causes said result information to be displayed on said display, registration of said another player having been instructed so that said another player is registered in association with said one player.

16. A terminal device according to claim 14, further comprising:
a view requester that generates a view request containing said player identifier of said one player read from said player-identifier storage and instructing that result information of said another player be transmitted as a response, said view request then being transmitted to said game server device, registration of said another player having been instructed by said registration requester so that said another player is registered in association with said one player;
a result-information storage that stores said result information of said another player, registration of said another player having been instructed so that said another player is registered in association with said one player;
a writer that, upon receiving from said game server device a view response as a response to said view request, said view response containing result information of said one player and said result information of said another player, writes in said result information storage said result information of said one player and said result information of said another player, registration of said another player having been instructed so that said another player is registered in association with said one player;

a reader that, upon receiving said view response from said game server device, reads from said result-information storage said result information of said one player and said result information of said another player stored as of the time a view response immediately previous to said view response was received, registration of said another player having been instructed so that said another player is registered in association with said one player;

a determiner that determines, as conditions for determination, whether said result information of said one player read by said reader exceeds said result information of said another player read by said reader and whether said result information of said one player contained in said received view response falls below said result information of said another player contained in said received view response, registration of said another player having been instructed so that said another player is registered in association with said one player; and a response processor that, in a case in which said determination conditions are found to be affirmative, causes said result information of said another player to be displayed on said display, registration of said another player having been instructed so that said another player is registered in association with said one player.

17. A terminal device according to claim 10, further comprising:

a view requester that generates a view request containing said player identifier of said one player read from said player-identifier storage and instructing that result information of said another player be transmitted as a response, said view request then being transmitted to said game server device, registration of said another player having been instructed by said registration requester, with said registration being made in association with said one player; and a response processor that, upon receiving from said game server device a view response containing said result information of said another player corresponding to said one player, with said view response being a response to said view request, causes said result information to be displayed on said display, registration of said another player having been instructed so that said another player is registered in association with said one player.

18. A terminal device according to claim 17, wherein the response processor compares the result information of the another player with result information of the one player, and based on the comparison, the response processor determines whether the one player is overtaken by the another player in the game result.

19. A terminal device according to claim 10, further comprising:

a view requester that generates a view request containing said player identifier of said one player read from said player-identifier storage and instructing that result information of said another player be transmitted as a response, said view request then being transmitted to said game server device, registration of said another player having been instructed by said registration requester so that said another player is registered in association with said one player;

a result-information storage that stores said result information of said another player, registration of said another player having been instructed so that said another player is registered in association with said one player;

a writer that, upon receiving from said game server device a view response as a response to said view request, said view response containing result information of said one player and said result information of said another player, writes in said result information storage said result information of said one player and said result information of said another player, registration of said another player having been instructed so that said another player is registered in association with said one player;

a reader that, upon receiving said view response from said game server device, reads from said result-information storage said result information of said one player and said result information of said another player stored as of the time a view response immediately previous to said view response was received, registration of said another player having been instructed so that said another player is registered in association with said one player;

a determiner that determines, as conditions for determination, whether said result information of said one player read by said reader exceeds said result information of said another player read by said reader and whether said result information of said one player contained in said received view response falls below said result information of said another player contained in said received view response, registration of said another player having been instructed so that said another player is registered in association with said one player; and a response processor that, in a case in which said determination conditions are found to be affirmative, causes said result information of said another player to be displayed on said display, registration of said another player having been instructed so that said another player is registered in association with said one player.

20. A method of controlling a game server device capable of communicating with a plurality of terminal devices, comprising:

storing a player identifier for identifying one player and a player identifier of another player specified by said one player in association with each other;

storing, upon receiving from one of said terminal devices a registration request containing said player identifier of said one player and said player identifier of said another player and instructing that said another player be registered in association with said one player, stores said player identifier of said one player in association with said player identifier of said another player;

identifying, upon receiving from said one terminal device a view request containing said player identifier of said one player and instructing that result information of said another player registered in association with said one player be transmitted as a response, a player identifier of said another player registered in association with said player identifier of said one player;

obtaining result information that is associated with said identified player identifier of said another player; and transmitting to said terminal device a view response containing said obtained result information as a response to said view request, wherein the game devices are arcade game devices; and wherein the terminal devices are mobile communication terminals.

21. A method according to claim 20, further comprising:

obtaining, upon receiving from said terminal device a candidate request containing said player identifier of said one player and instructing that candidates for a player to be compared with said one player be transmitted as a response, result information that is in association with said player identifier of said one player contained in said candidate request;

searching for retrieval of a player identifier of one or a plurality of players whose game result falls within a predetermined range with said obtained result information as a standard; and generating a candidate response containing said retrieved player identifier or a candidate response containing information that no player identifier has been retrieved and transmitting said candidate response to said terminal device as a response to said candidate request.

22. A control program product for use in a terminal device that comprises a communicator that communicates with a game server device capable of communicating with a plurality of game devices to obtain result information indicating a game result for each of a plurality of players and to store a player identifier for identifying each of said players in association with said result information and that comprises a display, an inputter that receives instructions from one of said players, a player-identifier storage that stores a player identifier of said one player, and an information processor, wherein said program product causes said information processor to execute:

a process of, when said one player operates said inputter to identify another of said players, identifying a player identifier of said another player;

a process of generating a registration request containing said player identifier of said one player and said player identifier of said another player and instructing that said another player be registered in association with said one player; and a process of transmitting said registration request to said game server device, wherein the game devices are arcade game devices; and wherein the terminal device is a mobile communication terminal.

23. A control program product according to claim 22, wherein said process of identifying said player identifier of said another player includes:

a process of causing a screen for prompting an input of said player identifier of said another player to be displayed on said display; and a process of obtaining said player identifier of said another player input by said inputter.

24. A control program product according to claim 22, wherein said game server device stores said player identifier and name information indicating a name of each of said players in association with each other; and wherein said information processor is further caused to execute:

a process of generating a candidate request, in accordance with operations of said inputter, a candidate request containing said player identifier of said one player and instructing that candidates for a player to be compared with said one player be transmitted as a response;

a process of transmitting said candidate request to said game server device;

a process of, upon receiving from said game server device a candidate response containing a player identifier specifying a candidate for a player to be compared with said one player and also containing name information, with said candidate response being a response to said candidate request, causing said candidate for a player to be compared with said one player to be displayed on said display on the basis of said name information; and a process of, when said player uses said inputter to select said candidate displayed on said display, identifying a player identifier corresponding to said selected candidate as said player identifier of said another player.

25. A control program product according to claim 22, wherein said information processor is further caused to execute:

a process of generating a view request containing said player identifier of said one player read from said player-identifier storage and instructing that result information of said another player be transmitted as a response, registration of said another player having been instructed so that said another player is registered in association with said one player;

a process of transmitting said view request to said game server device; and a process of, upon receiving from said game server device a view response containing said result information of said another player registered in association with said one player, with said view response being a response to said view request, causing said result information to be displayed on said display.

26. A control program product according to claim 25, wherein the process of causing the result information to be displayed on the display includes comparing the result information of the another player with result information of the one player, and based on the comparison, determining whether the one player is overtaken by the another player in the game result.

27. A control program product according to claim 22, wherein said information processor is further caused to execute:

a process of generating a view request containing said player identifier of said one player read from said player-identifier storage and instructing that result information of said one player and result information of said another player be transmitted as a response, registration of said another player having been instructed so that said another player is registered in association with said one player;

a process of transmitting said view request to said game server device;

a process of storing said result information of said one player and said result information of said another player, registration of said another player having been instructed so that said another player is registered in association with said one player;

a process of storing, upon receiving from said game server device a view response containing said result information of said one player and said result information of said another player, registration of said another player having been instructed so that said another player is registered in association with said one player and said view response being a response to said view request, said result information of said one player and said result information of said another player contained in said view response;

a process of reading, upon receiving said view response from said game server device, said result information of said one player and said result information of said another player stored as of the time a view response immediately previous to said view response was received, registration of said another player having been instructed so that said another player is registered in association with said one player;

a process of determining, as conditions for determination, whether said result information of said one player read by said reader exceeds said result information of said another player read by said reader and whether said result information of said one player contained in said received view response falls below said result information of said another player contained in said received view response, registration of said another player having been instructed so that said another player is registered in association with said one player; and a process of, when said determination conditions are found to be affirmative, causing said result information of said another player to be displayed on said display, registration of said another player having been instructed so that said another player is registered in association with said one player.

* * * * *